US012618985B2

(12) United States Patent
Peng et al.

(10) Patent No.: US 12,618,985 B2
(45) Date of Patent: May 5, 2026

(54) COOPERATIVE POSITIONING WITH MULTIPLE GLOBAL NAVIGATION SATELLITE SYSTEM RECEIVERS

(71) Applicant: QUALCOMM Incorporated, San Diego, CA (US)

(72) Inventors: Yuxiang Peng, Sunnyvale, CA (US); Min Wang, Tustin, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 18/168,102

(22) Filed: Feb. 13, 2023

(65) Prior Publication Data

US 2024/0272309 A1     Aug. 15, 2024

(51) Int. Cl.
G01S 19/51 (2010.01)
G01S 19/07 (2010.01)
(Continued)

(52) U.S. Cl.
CPC .............. G01S 19/51 (2013.01); G01S 19/07 (2013.01); G01S 19/44 (2013.01); *G01S 19/396* (2019.08); *G01S 19/41* (2013.01); *G01S 19/43* (2013.01)

(58) Field of Classification Search
CPC .......... G01S 19/51; G01S 19/44; G01S 19/07; G01S 19/41; G01S 19/43; G01S 19/396
(Continued)

(56) References Cited

U.S. PATENT DOCUMENTS

| 4,870,422 A | * | 9/1989 | Counselman, III | ..... G01S 19/44 |
| | | | | 342/450 |
| 5,148,179 A | * | 9/1992 | Allison | .................. G01S 19/44 |
| | | | | 342/357.44 |

(Continued)

FOREIGN PATENT DOCUMENTS

| CA | 3148047 A1 | * | 8/2022 | .............. G01S 19/44 |
| EP | 2749900 A1 | * | 7/2014 | .............. G01S 19/44 |
| EP | 3968055 A2 | * | 3/2022 | ........... G01C 21/165 |

OTHER PUBLICATIONS

International Search Report and Written Opinion—PCT/US2024/010452—ISA/EPO—Sep. 17, 2024.
(Continued)

*Primary Examiner* — Chuong P Nguyen
(74) *Attorney, Agent, or Firm* — QUALCOMM Incorporated

(57) ABSTRACT

Techniques are provided for integrating GNSS measurements between two or more GNSS receivers. An example method includes determining an antenna baseline vector based on relative locations of a first antenna that is communicatively coupled to a first GNSS receiver and a second antenna that is communicatively coupled to a second GNSS receiver, determining a first position estimate and a first integer ambiguity resolution (IAR) status with the first GNSS receiver at a first time, determining a second position estimate and a second IAR status with the second GNSS receiver at approximately the first time, computing a horizontal offset value based on the antenna baseline vector and a difference between the first position estimate and the second position estimate, and generating the wrong fix indication in response to the first IAR status being fixed, the second IAR status being fixed, and the horizontal offset value being greater than a threshold value.

25 Claims, 13 Drawing Sheets

(51) Int. Cl.

| | |
|---|---|
| *G01S 19/44* | (2010.01) |
| *G01S 19/39* | (2010.01) |
| *G01S 19/41* | (2010.01) |
| *G01S 19/43* | (2010.01) |

(58) Field of Classification Search
USPC ............ 342/357.27, 357.24, 357.26, 357.34,
342/357.22, 357.44
See application file for complete search history.

(56) References Cited

U.S. PATENT DOCUMENTS

| | | | | |
|---|---|---|---|---|
| 9,971,037 | B2 * | 5/2018 | Dickman | ................. G01S 19/23 |
| 10,260,888 | B2 * | 4/2019 | Takahashi | ............... G01S 19/43 |
| 10,795,030 | B2 * | 10/2020 | Schipper | .............. G01C 21/165 |
| 10,996,342 | B2 * | 5/2021 | Kadoya | ................... G01S 19/42 |
| 11,187,812 | B2 * | 11/2021 | Yamazaki | ............... G01S 19/43 |
| 11,802,971 | B2 * | 10/2023 | Luo | .......................... G01S 19/12 |
| 11,846,715 | B2 * | 12/2023 | Wang | ...................... G01S 19/44 |
| 12,130,369 | B2 * | 10/2024 | Wang | ...................... G01S 19/32 |
| 2017/0363746 | A1 | 12/2017 | Kadoya | |
| 2020/0081135 | A1 | 3/2020 | Yamazaki | |
| 2024/0418871 | A1 * | 12/2024 | Peng | .................... H04W 4/029 |

OTHER PUBLICATIONS

Zhenkun L., et al., "GPS Dynamic Cycle Slip Detection and
Correction with Baseline Constraint", Chinese Journal of Systems
Engineering and Electronics, Second Academy Ministry of Aero-
space Industry, Beijing, CN, vol. 20, No. 1 Feb. 2009, pp. 60-64,
XP011377407, Lines 0034-0061, 0094, Figures 3, 4A, 4B.

* cited by examiner

1000

Detect a first global navigation satellite system (GNSS) receiver                1002

Determine an antenna baseline vector based on relative locations of a first antenna communicatively coupled to the first GNSS receiver and a second antenna that is communicatively coupled to a second GNSS receiver                1004

1100

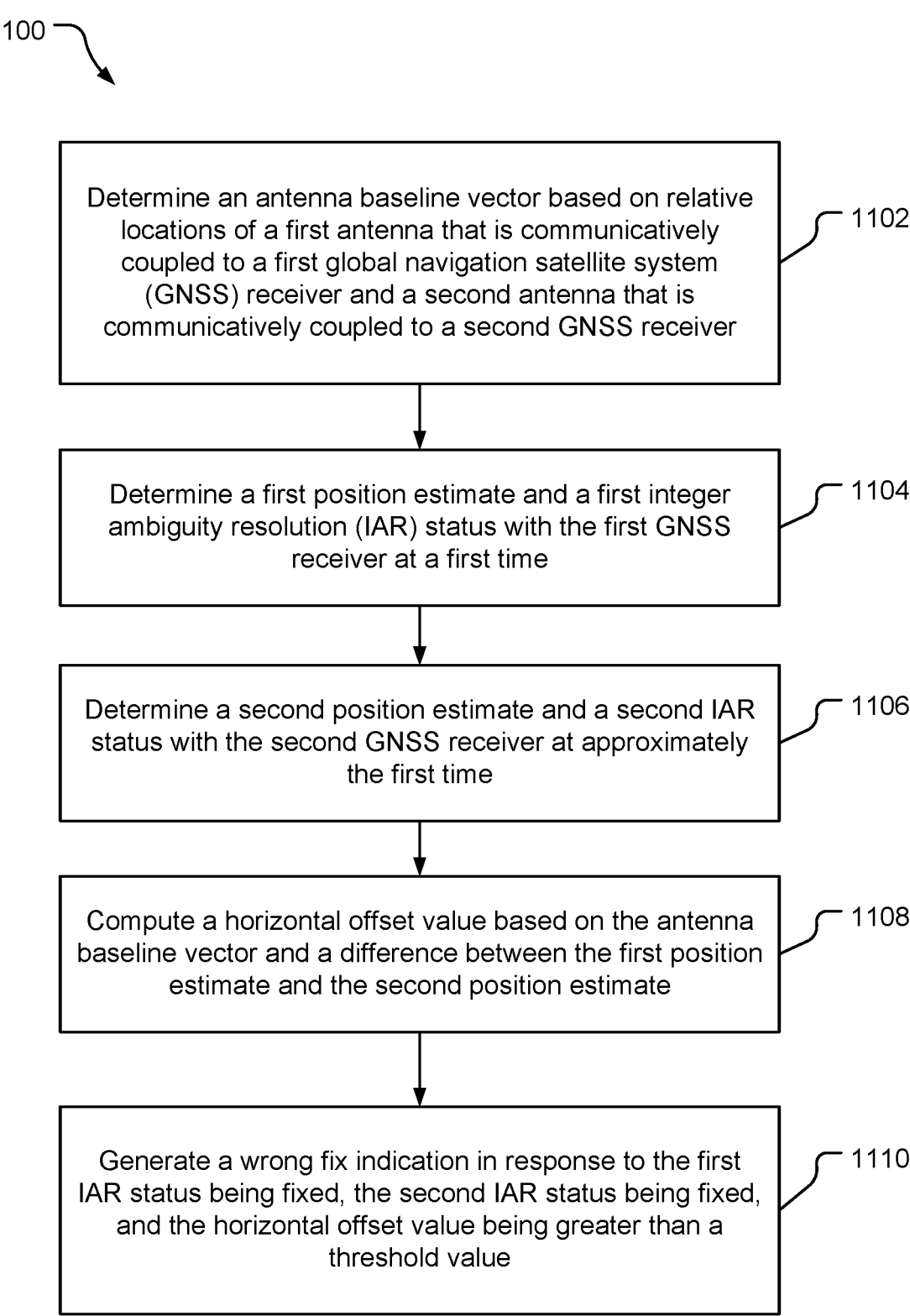

Determine an antenna baseline vector based on relative locations of a first antenna that is communicatively coupled to a first global navigation satellite system (GNSS) receiver and a second antenna that is communicatively coupled to a second GNSS receiver — 1102

Determine a first position estimate and a first integer ambiguity resolution (IAR) status with the first GNSS receiver at a first time — 1104

Determine a second position estimate and a second IAR status with the second GNSS receiver at approximately the first time — 1106

Compute a horizontal offset value based on the antenna baseline vector and a difference between the first position estimate and the second position estimate — 1108

Generate a wrong fix indication in response to the first IAR status being fixed, the second IAR status being fixed, and the horizontal offset value being greater than a threshold value — 1110

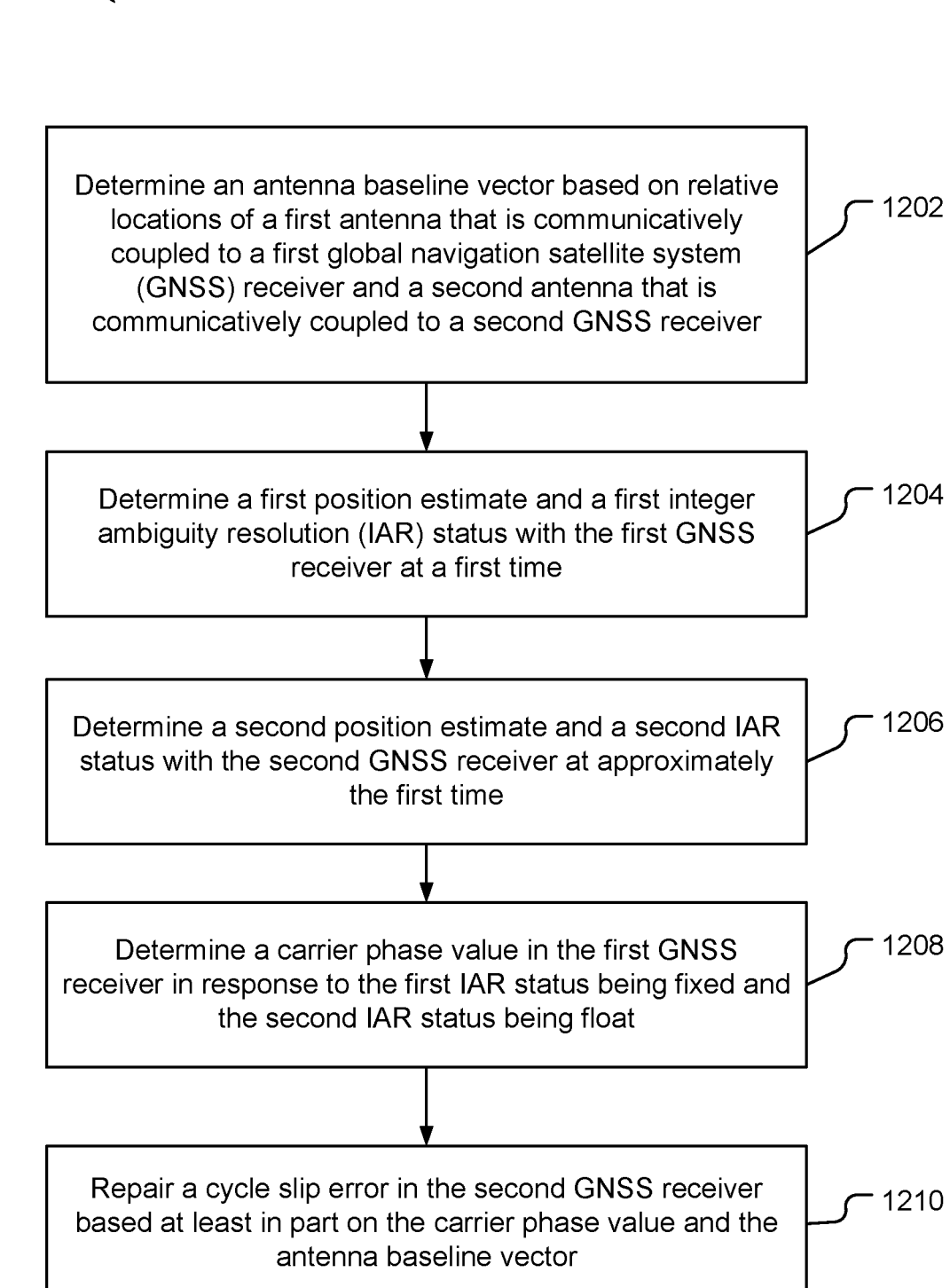

Determine an antenna baseline vector based on relative locations of a first antenna that is communicatively coupled to a first global navigation satellite system (GNSS) receiver and a second antenna that is communicatively coupled to a second GNSS receiver — 1202

Determine a first position estimate and a first integer ambiguity resolution (IAR) status with the first GNSS receiver at a first time — 1204

Determine a second position estimate and a second IAR status with the second GNSS receiver at approximately the first time — 1206

Determine a carrier phase value in the first GNSS receiver in response to the first IAR status being fixed and the second IAR status being float — 1208

Repair a cycle slip error in the second GNSS receiver based at least in part on the carrier phase value and the antenna baseline vector — 1210

*FIG. 12*

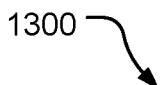

1300

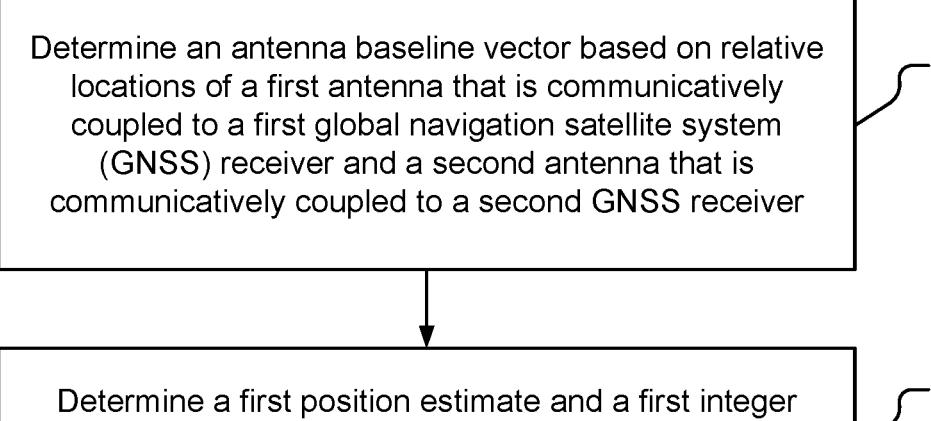

Determine an antenna baseline vector based on relative locations of a first antenna that is communicatively coupled to a first global navigation satellite system (GNSS) receiver and a second antenna that is communicatively coupled to a second GNSS receiver — 1302

Determine a first position estimate and a first integer ambiguity resolution (IAR) status with the first GNSS receiver — 1304

Provide the first position estimate and the antenna baseline vector to the second GNSS receiver in response to the first IAR status being fixed — 1306

*FIG. 13*

COOPERATIVE POSITIONING WITH MULTIPLE GLOBAL NAVIGATION SATELLITE SYSTEM RECEIVERS

FIELD

The subject matter disclosed herein relates generally to satellite based positioning systems, and in particular, to systems and methods for integrating Global Navigation Satellite System (GNSS) receiver measurements between two or more GNSS receivers.

BACKGROUND

The Global Positioning System (GPS) is an example of a GNSS navigation system in which a receiver determines its position by precisely measuring the arrival time of signaling events received from multiple satellites. Each satellite transmits a navigation message containing the precise time when the message was transmitted and ephemeris information. GNSS accuracy may degrade significantly under weak signal conditions such as when the line-of-sight (LOS) to the satellite vehicles is obstructed by natural or manmade objects. In some cases, the weak signals may cause cycle slip and diminish the integer ambiguity resolution (IAR) in the GNSS receiver. Such errors may induce an absolute position error of the order of tens of meters (e.g. as much as 50 meters) and relative position error of the order several meters. In addition, accuracy may be further degraded by the limited availability of good GNSS measurements. For example, with GNSS measurements that use carrier phase to achieve higher accuracy, positioning accuracy is dependent on a constant lock. Techniques to quickly resolve IAR and repair cycle slip failures may improve the accuracy and robustness of GNSS receivers.

SUMMARY

An example method for generating a wrong fix indication based on measurements from multiple global navigation satellite system (GNSS) receivers according to the disclosure includes determining an antenna baseline vector based on relative locations of a first antenna that is communicatively coupled to a first global navigation satellite system (GNSS) receiver and a second antenna that is communicatively coupled to a second GNSS receiver, determining a first position estimate and a first integer ambiguity resolution (IAR) status with the first GNSS receiver at a first time, determining a second position estimate and a second IAR status with the second GNSS receiver at approximately the first time, computing a horizontal offset value based on the antenna baseline vector and a difference between the first position estimate and the second position estimate, and generating the wrong fix indication in response to the first IAR status being fixed, the second IAR status being fixed, and the horizontal offset value being greater than a threshold value.

An example method for repairing a cycle slip error in a global navigation satellite system (GNSS) receiver according to the disclosure includes determining an antenna baseline vector based on relative locations of a first antenna that is communicatively coupled to a first global navigation satellite system (GNSS) receiver and a second antenna that is communicatively coupled to a second GNSS receiver, determining a first position estimate and a first integer ambiguity resolution (IAR) status with the first GNSS receiver at a first time, determining a second position estimate and a second IAR status with the second GNSS receiver at approximately the first time, determining a carrier phase value in the first GNSS receiver in response to the first IAR status being fixed and the second IAR status being float, and repairing the cycle slip error in the second GNSS receiver based at least in part on the carrier phase value and the antenna baseline vector.

An example method for improving positioning accuracy convergence in two global navigation satellite system (GNSS) receivers according to the disclosure includes determining an antenna baseline vector based on relative locations of a first antenna that is communicatively coupled to a first global navigation satellite system (GNSS) receiver and a second antenna that is communicatively coupled to a second GNSS receiver, determining a first position estimate and a first integer ambiguity resolution (IAR) status with the first GNSS receiver, and providing the first position estimate and the antenna baseline vector to the second GNSS receiver in response to the first IAR status being fixed.

Items and/or techniques described herein may provide one or more of the following capabilities, as well as other capabilities not mentioned. Two or more GNSS receivers may receive satellite signals and generate position estimates. An antenna baseline vector may be determined based on the relative geometry of the GNSS receiver antennas. GNSS measurement data obtained by the respective GNSS receivers may be integrated based at least in part on the antenna baseline vector. The resulting positioning performance may be enhanced such that the occurrence of IAR wrong fix errors may be reduced, and carrier phase cycle slip detection and repair may be improved. In some implementations, the time required for positioning accuracy convergence for GNSS measurements in the respective GNSS receivers may decrease, and the time required to determine a vehicle heading to perform an alignment procedure with an inertial measurement unit (IMU) may be reduced. Other capabilities may be provided and not every implementation according to the disclosure must provide any, let alone all, of the capabilities discussed.

BRIEF DESCRIPTION OF THE DRAWINGS

FIG. 11 is a process flow message of an example method for generating a wrong fix indication based on measurements from multiple GNSS receivers.

FIG. 12 is a process flow message of an example method for repairing a cycle slip error in a GNSS receiver.

FIG. 13 is a process flow message of an example method for improving positioning accuracy convergence in two GNSS receivers.

DETAILED DESCRIPTION

Figure 1:
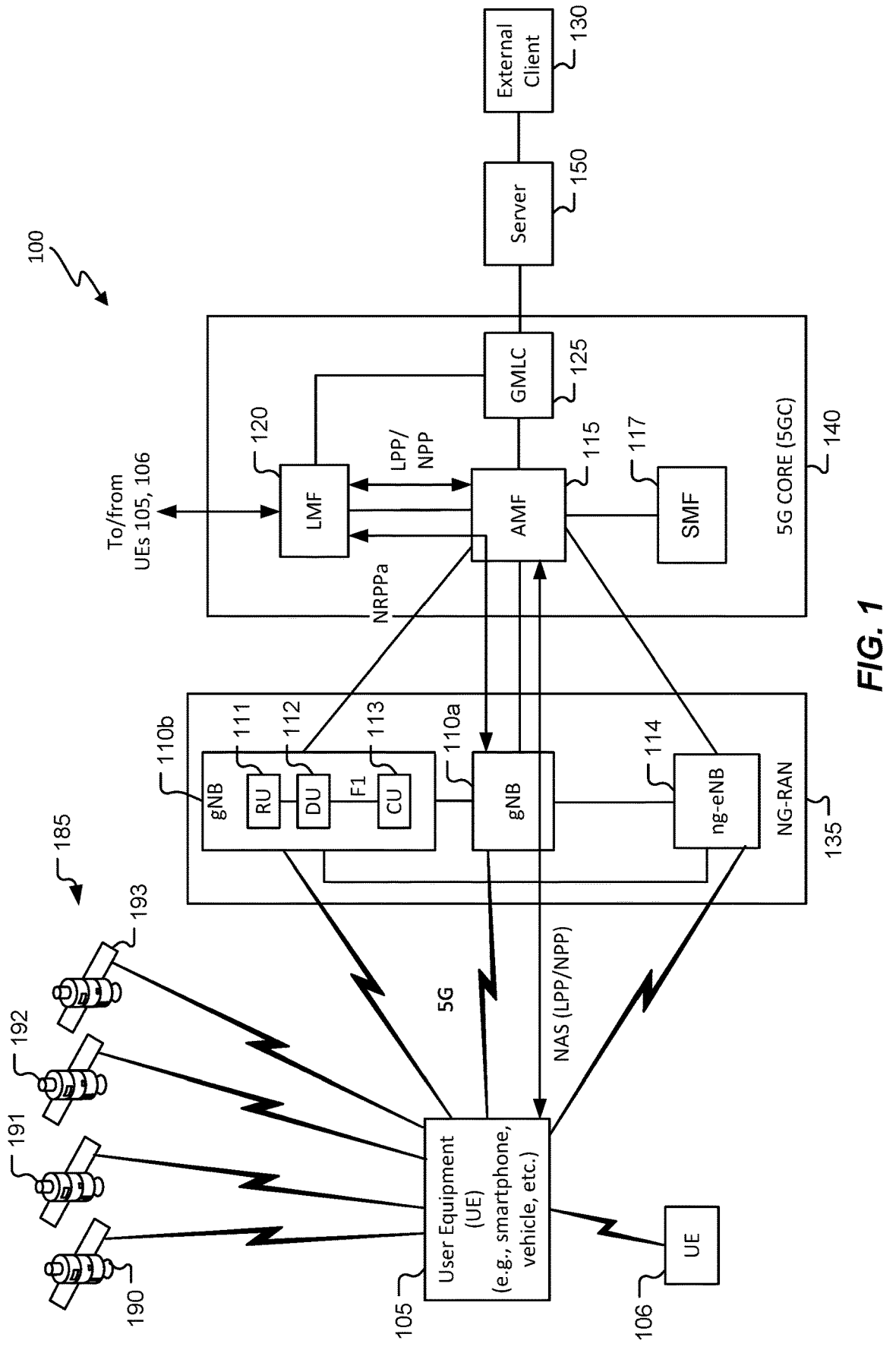
FIG. 1 is a simplified diagram of an example wireless communications system.

Techniques are discussed herein for integrating GNSS measurements between two or more GNSS receivers and respective antenna modules. Precise positioning techniques such as precise point positioning (PPP) and real-time kinematic (RTK) positioning are being implemented on more and more commercial use cases such as smartphones or automotives (auto). These techniques are capable of decimeter or centimeter level positioning, however, the positioning accuracy may be significantly degraded under challenging environments. For example, integer ambiguity resolution (IAR) may lead to wrong integer fixes, cycle slip repair failure may lead to fixed ambiguity information loss, and IAR fix convergence or reconvergence may be degraded due to a lack of valid GNSS measurements.

In vehicle based use cases, users may access GNSS information for vehicle navigation. A user may have the option to utilize a smartphone with a GNSS receiver and a navigation application (e.g., Google Map, Waze, etc.), or a vehicle based navigation system. In an example, the output of the navigation system in the smartphone may be displayed on a screen in the vehicle such that the vehicle operator may view the navigation solution generated by the smartphone (e.g., Apple CarPlay, Android Auto, etc.). This functionality, however, does not integrate satellite signals measured, or the positioning results generated, by both the smartphone GNSS system with the vehicle GNSS system.

The cooperative positioning techniques described herein may leverage the abilities of multiple GNSS receivers to improve the robustness and positioning accuracy of the receivers. In an example, a first GNSS receiver may be a vehicle based GNSS system including a fixed external antenna, and a second GNSS receiver may be a user equipment (UE) (e.g., smartphone) with an integrated antenna module. An antenna baseline vector may be determined based on the geometry between the antenna modules for the respective GNSS receivers. The GNSS measurement data obtained by the respective vehicle and UE GNSS systems may be integrated based at least in part on the antenna baseline vector. The resulting positioning performance may be enhanced such that the occurrence of IAR wrong fix errors may be reduced, carrier phase cycle slip detection and repair may be improved, the time required for positioning accuracy convergence for GNSS measurements in challenging environments may be decreased, and the time required to determine a vehicle heading and perform an alignment procedure with an inertial measurement unit (IMU) may be reduced. The vehicle based GNSS receiver and the UE may be configured to exchange data via various signaling techniques such as existing auto software interfaces (e.g., Apple CarPlay, Android Auto, Honda HandsFree, etc.). Other signaling techniques, such as binary and ASCII based protocols may also be used.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, on-board unit (OBU), etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," "a wireless node," a "subscriber device," a "subscriber terminal," a "subscriber station," a "user terminal" or UT, a "mobile terminal," a "mobile station," a "mobile device," or variations thereof. A UE disposed in a vehicle may be called an on-board unit (OBU). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
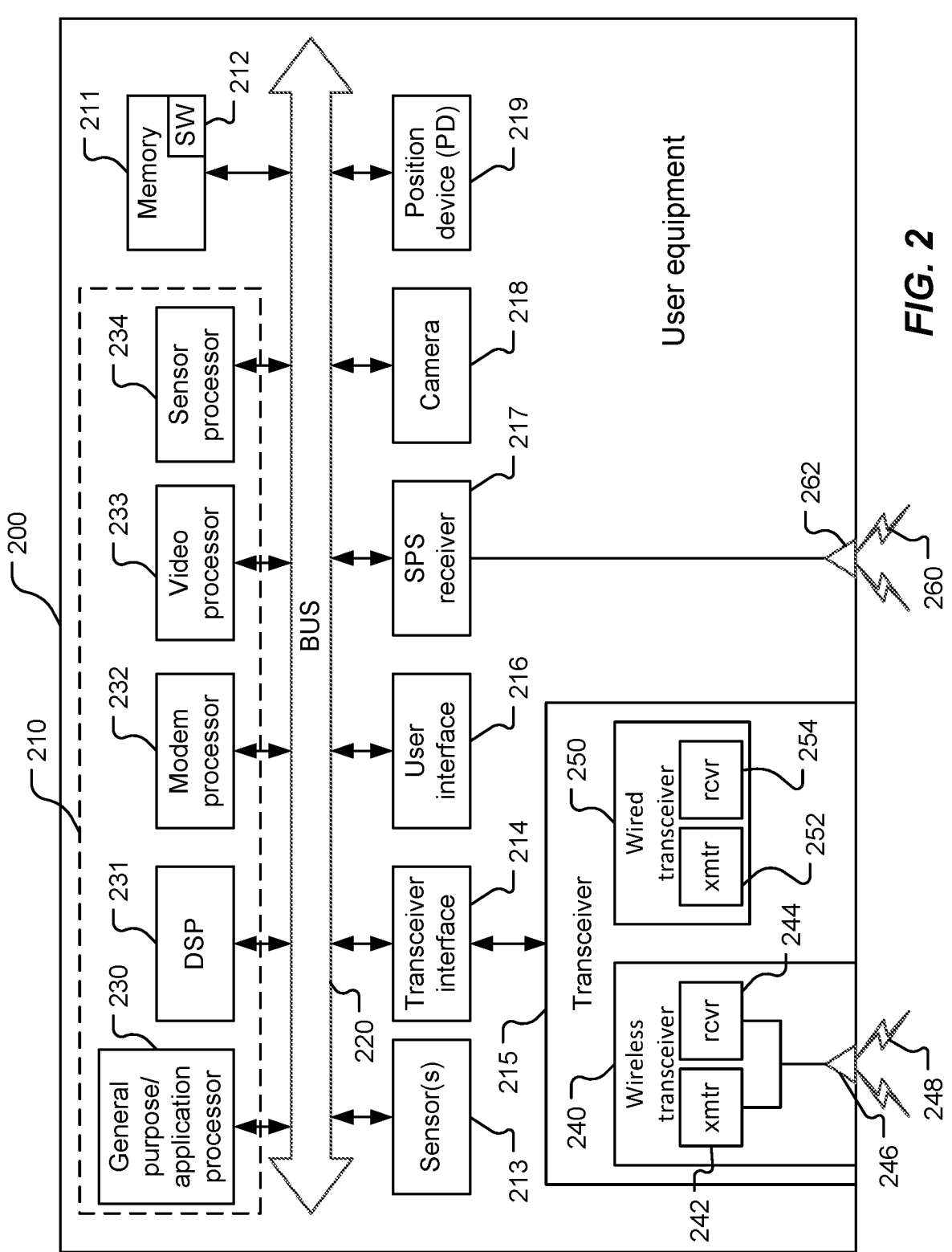
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), UltraWideBand (UWB), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
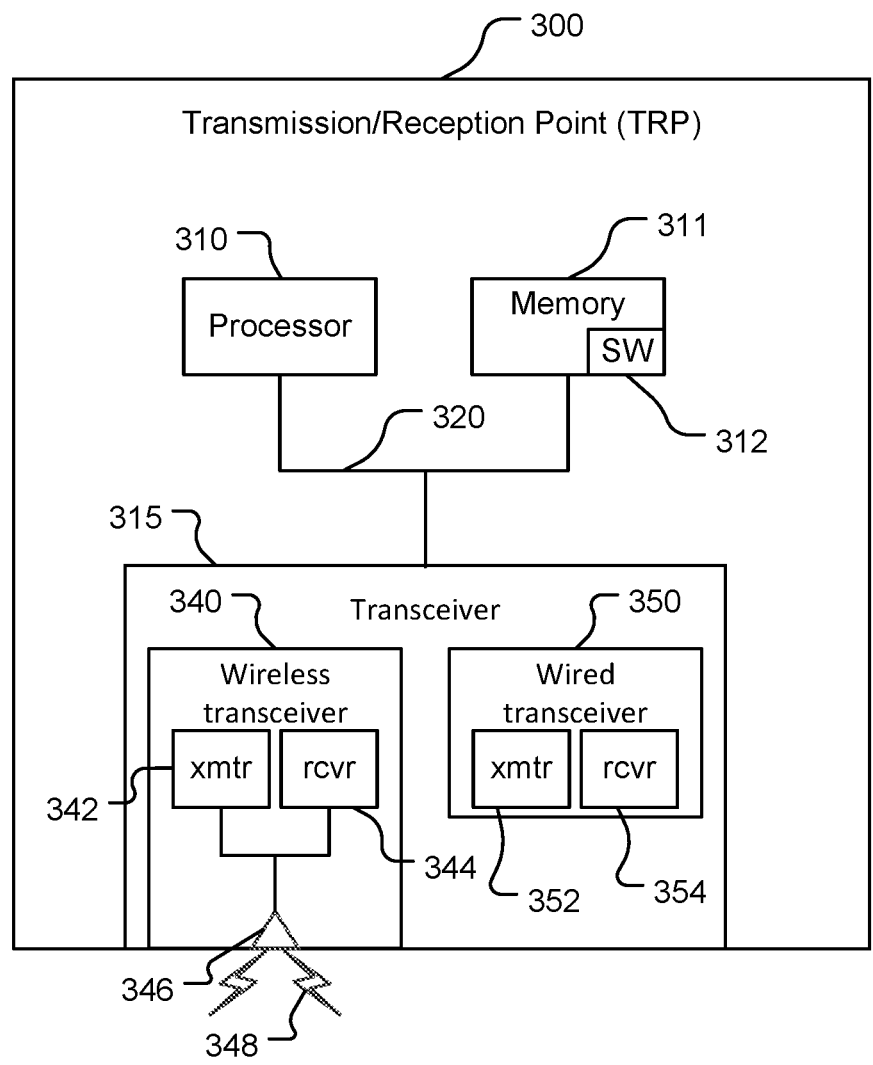
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), UWB, Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions). In an example, a RSU may include some or all of the components of a TRP 300. The TRP 300 may be an example of a wireless node in a communications network.

Figure 4:
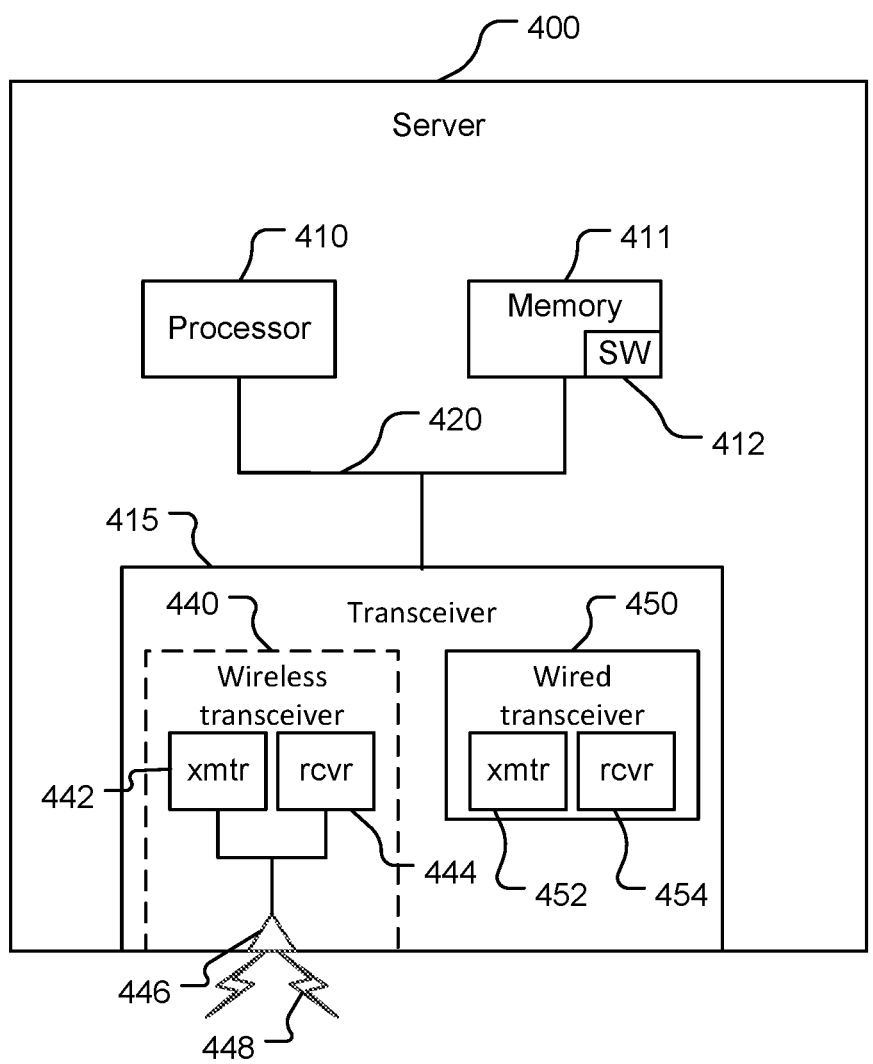
FIG. 4 is a block diagram of components of a server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), UWB, Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Figure 5:
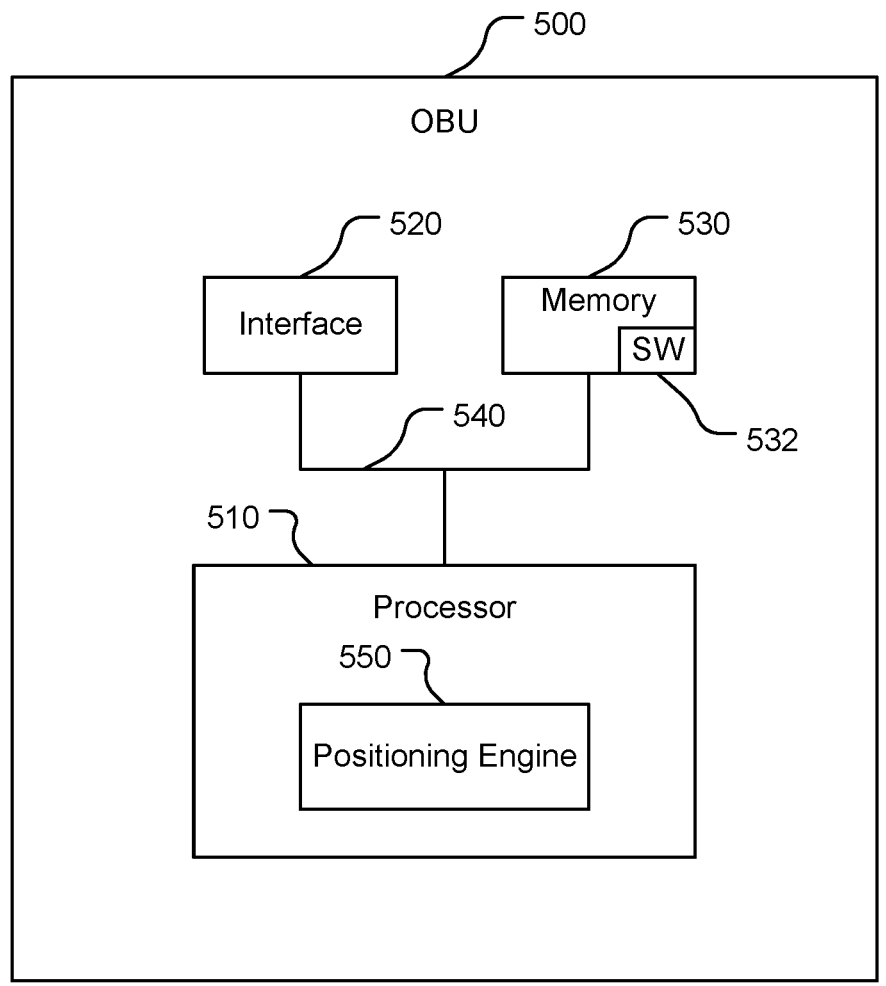
FIG. 5 is a block diagram of an example on-board unit.

Referring to FIG. 5, with further reference to FIGS. 1-4, an OBU 500 (on-board unit) includes a processor 510, an interface 520, and a memory 530 communicatively coupled to each other by a bus 540. The OBU 500 may include some or all of the components shown in FIG. 5, and may include one or more other components such as any of those shown in FIG. 2, and/or may communicate with one or more other devices (via the interface 520) with one or more features of the UE 200 (e.g., an IMU, a camera, sensors, etc.). The OBU 500 is an example of a wireless node. The processor 510 may include one or more components of the processor 210. The interface 520 is configured to transmit and receive V2X signals, e.g., C-V2X signals (i.e., signals of a C-V2X format, e.g., for communication). The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software 532 with processor-readable instructions configured to cause the processor 510 to perform functions. The OBU 500 may be a UE, such as the UE 200, that is also configured to communicate using C-V2X technology.

The description herein may refer to the processor 510 performing a function, but this includes other implementations such as where the processor 510 executes software (stored in the memory 530) and/or firmware. The description herein may refer to the OBU 500 performing a function as shorthand for one or more appropriate components (e.g., the processor 510 and the memory 530) of the OBU 500 performing the function. The processor 510 (possibly in conjunction with the memory 530 and, as appropriate, the interface 520) includes an positioning engine 550. The positioning engine 550 may include the processing capabilities and instructions to perform the satellite and terrestrial computations for the techniques described herein.

Figure 6:
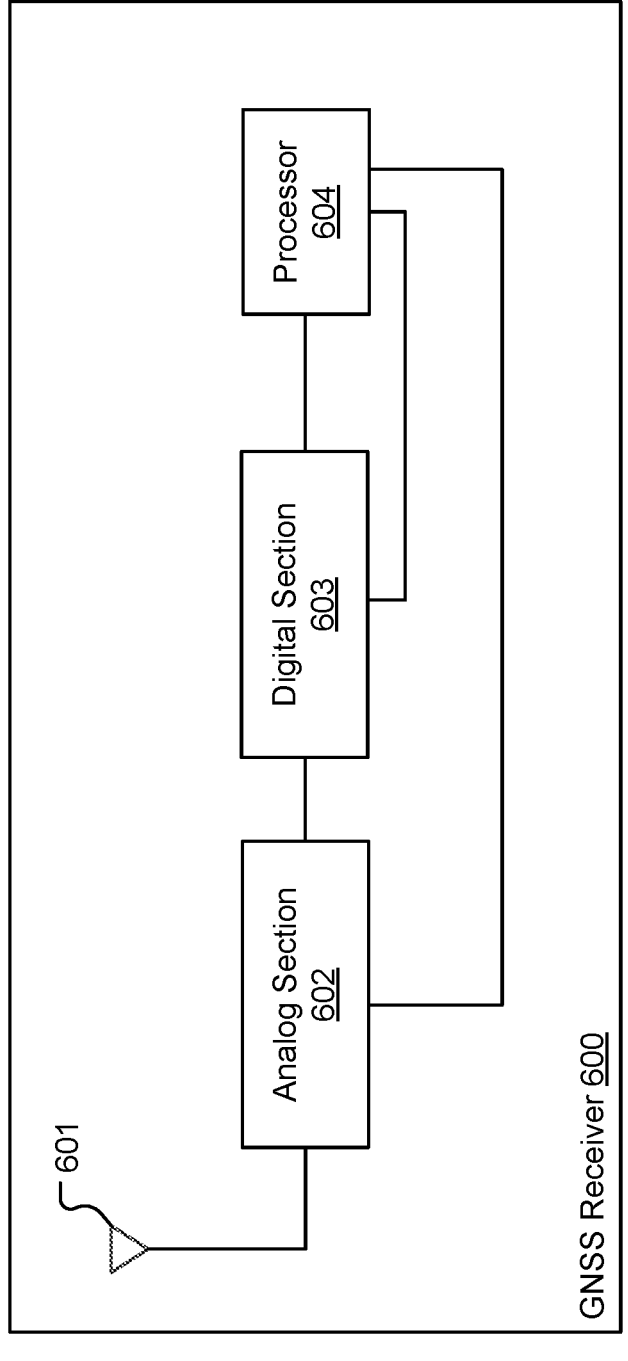
FIG. 6 is a block diagram of an example global navigation satellite system (GNSS) receiver.

Referring to FIG. 6, a diagram of an example GNSS receiver 600 is shown. The SPS receiver 217 in the UE 200, and the interface 520 in the OBU 500, may include one or more components of the GNSS receiver 600 and thus may be examples of the GNSS receiver 600. In an example, the Global Positioning System (GPS) is an example of a GNSS navigation system in which a receiver determines its position by precisely measuring the arrival time of signaling events received from multiple satellites. Each satellite transmits a navigation message containing the precise time when the message was transmitted and ephemeris information. Each sub-frame of the navigation message starts with a telemetry word (TLM) and the number of the sub-frame. The start of the sub-frame may be detected by means of a preamble sequence in the TLM. Each sub-frame also includes a handover word (HOW), which gives the exact time of the week (TOW) when the satellite will transmit the next sub-frame according to the local version of GPS time held by the satellite's clock. The ephemeris information includes details about the satellite's orbit and corrections for the satellite's own clock, in comparison with GPS time. The ephemeris and clock correction parameters may collectively be known as ephemeris information.

GPS signals are formed of a navigation message binary phase shift modulated (BPSK) onto a direct sequence spread spectrum signal. The spread spectrum signal comprises a unique pseudo-noise (PN) code that identifies the satellite. For civil application GPS signals transmitted using the L1 frequency, this code is known as the C/A code. The C/A code has a sequence length of 1023 chips and it is spread with a 1.023 MHz chipping rate. The code sequence therefore repeats every millisecond. The code sequence has an identified start instant when the two code generators in the satellite just transition to the all '1's' state. This instant is known as the code epoch. After various transport delays in the satellite, the code epoch is broadcast through the timing and sequence of specific code states assigned to the satellite. This signaling event can be recognized, in suitably adapted receivers, through a process of aligning a replica code with the code received from each satellite.

The navigation message has a data rate of 50 bits per second, lower than the code rate, and its data bit or symbol transitions are synchronized with the start of the C/A code sequence. Each bit of the navigation message lasts for 20 milliseconds and thus incorporates 20 repetitions of the C/A code. The navigation message is constructed from a 1500-bit frame consisting of five 300-bit sub-frames. Each sub-frame lasts for 6 seconds. The satellite transmits the navigation message and C/A code using a carrier frequency that is an integer multiple of 10.23 MHz (for the L1 carrier, the multiple is 154).

In addition to the time and ephemeris information, the data message also contains the satellite constellation almanac, parameters representing the ionospheric and tropospheric delay, health parameters and other information used by some receivers. There are 25 different frames of data broadcast from each satellite. Each frame contains identical information (apart from time) in sub-frames 1-3 inclusive but cycles through a pre-assigned sequence of data in sub-frames 4 and 5, which contain almanac and other information. The ephemeris information, including the satellite clock biases, is periodically refreshed by the GPS Control Segment, typically every 2 hours, so that the navigation data message is representative of the orbit and status of each satellite. There are indicators in the navigation message which provide the user with knowledge of when the ephemeris and clock data has been changed. Details of these changes are set out in the GPS interface standard, IS GPS 200.

The GNSS receiver 600 may be a GPS receiver, and may be configured to determine the time-of-arrival of a signaling event through a process of aligning a replica code with the code received from each satellite. The receiver may also use the TOW information contained in the navigation message to determine the time when the signaling event was transmitted. From this, the receiver can determine the transit time for the signaling event (from which it can determine the distance between it and the satellite), together with the position of the satellite at the time when the signaling event was transmitted (using the ephemeris information). The receiver can then calculate its own position. Theoretically, the position of the GPS receiver can be determined using signals from three satellites, providing the receiver has a precise time or knowledge of part of the positions, such as altitude. However, in practice GPS receivers use signals from four or more satellites to determine an accurate three-dimensional location solution because an offset between the receiver clock and GPS time introduces an additional unknown into the calculation.

If the satellite signal reception is poor (commonly known as weak signal conditions), or if the receiver only receives a short burst of the signal, the receiver may not be able to decode the TOW information. Without this information, the GPS receiver may be unable to determine the distance between it and the satellite with sufficient accuracy because the receiver will not know the time when the signaling event was transmitted. Under weak signal conditions or briefly glimpsed signals, the receiver may also be unable to recognize the start of a sub-frame since it may not be able to decode the TLM.

A receiver that has been unable to decode the TLM and TOW information in the navigation message may nonetheless be able to deduce some timing information even under weak signal conditions or from briefly glimpsed signals. For example, the receiver may be able to determine a time shift between the satellite signal's spreading (PN) code and a locally generated version of the same, e.g. by correlating the received signal with a locally generated replica of the PN code or by using an equivalent signal processing technique. This time shift represents at least part of the transit time for the satellite signal. However, since both the PN code in the signal and the locally generated replica code are of finite length in space (known as the code wavelength), the correlation operation can only identify a part of the total time shift. This part of the total time shift represents a fractional part of the signal transit time between satellite and the receiver, measured in code repetition intervals. The integer number of code repetition intervals the signal took to travel between the satellite and the receiver cannot be measured by the receiver (e.g., integer ambiguity value).

GNSS accuracy may degrade significantly under weak signal conditions such as when the line-of-sight (LOS) to the satellite vehicles is obstructed by natural or manmade objects. In some cases, the weak signals may cause cycle slip and diminish the integer ambiguity resolution (IAR) in the GNSS receiver. Such errors may induce an absolute position error of the order of tens of meters (e.g. as much as 50 meters) and relative position error of the order several meters. In addition, accuracy may be further degraded by the limited availability of good GNSS measurements. For example, with GNSS measurements that use carrier phase to achieve higher accuracy, positioning accuracy is dependent on a constant lock.

In an example, the GNSS receiver 600 includes, without limitation, an antenna 601, an analog section 602, a digital section 603, and a processor 604. The antenna 262 on the UE 200 is an example of the antenna 601. GNSS satellite signals are received by the antenna 601 and are coupled to an input of the analog section 602. The analog section 602 is configured to process the GNSS satellite signals and produce a digital intermediate frequency (IF) signal by sampling the GNSS satellite signal with an analog to digital converter (ADC). In one embodiment, the sample rate may be approximately 83 mega-samples per second (Ms/s). The digital IF signal is coupled to the input of the digital section 603. The digital section 603 is configured to utilize the digital IF signal to acquire and track satellites from within the GNSS satellite constellation by producing acquisition and tracking data that is coupled to the processor 604. The processor 604 may be a central processing unit CPU, a microprocessor, a digital signal processor, or any other such device that may read and execute programming instructions. The processor 604 is configured to analyze the acquisition and tracking data to determine navigation information such as location and velocity. A satellite may transmit signals on a plurality of frequencies and the processor 604 may be configured to determine pseudorange and carrier-phase measurements based on GNSS models as known in the art. For example, in general, a pseudorange measurement $$\rho_1^{[i]}$$

to a satellite [i] on frequency $f_1$ can be modeled as:

$$\rho_1^{[i]} = r^{[i]} + \left(\delta t_u - \delta t_1^{[i]}\right) \cdot c + B_1 + I_1^{[i]} + T^{[i]} + \epsilon_{\rho_1}^{[i]} \qquad (1)$$

where:
$r^{[i]}$ is the true range between satellite-[i] and user position.
$\delta t_u$ is the common bias in user equipment.

$$\delta t_1^{[i]}$$

is the satellite clock bias for satellite-[i] including any satellite group-delay on frequency $f_1$.
c is the speed of light.
$B_1$ is the additional bias in user equipment common for measurements made on frequency $f_1$.

$$I_1^{[i]}$$

is the ionospheric delay affecting the signal from satellite-[i] on frequency $f_1$.
$T^{[i]}$ is the delay introduced in signal from satellite-[i] by troposphere and is frequency-independent.

$$\epsilon_{\rho_1}^{[i]}$$

is to account for noise and any unmodeled effects.
Other GNSS models and variables may also be used to determine a range to a satellite. A carrier phase measurement may be based on the range between a satellite and a receiver (e.g., the receiver antenna), expressed in units of cycles of the carrier frequency.

Figures 7A, 7B:
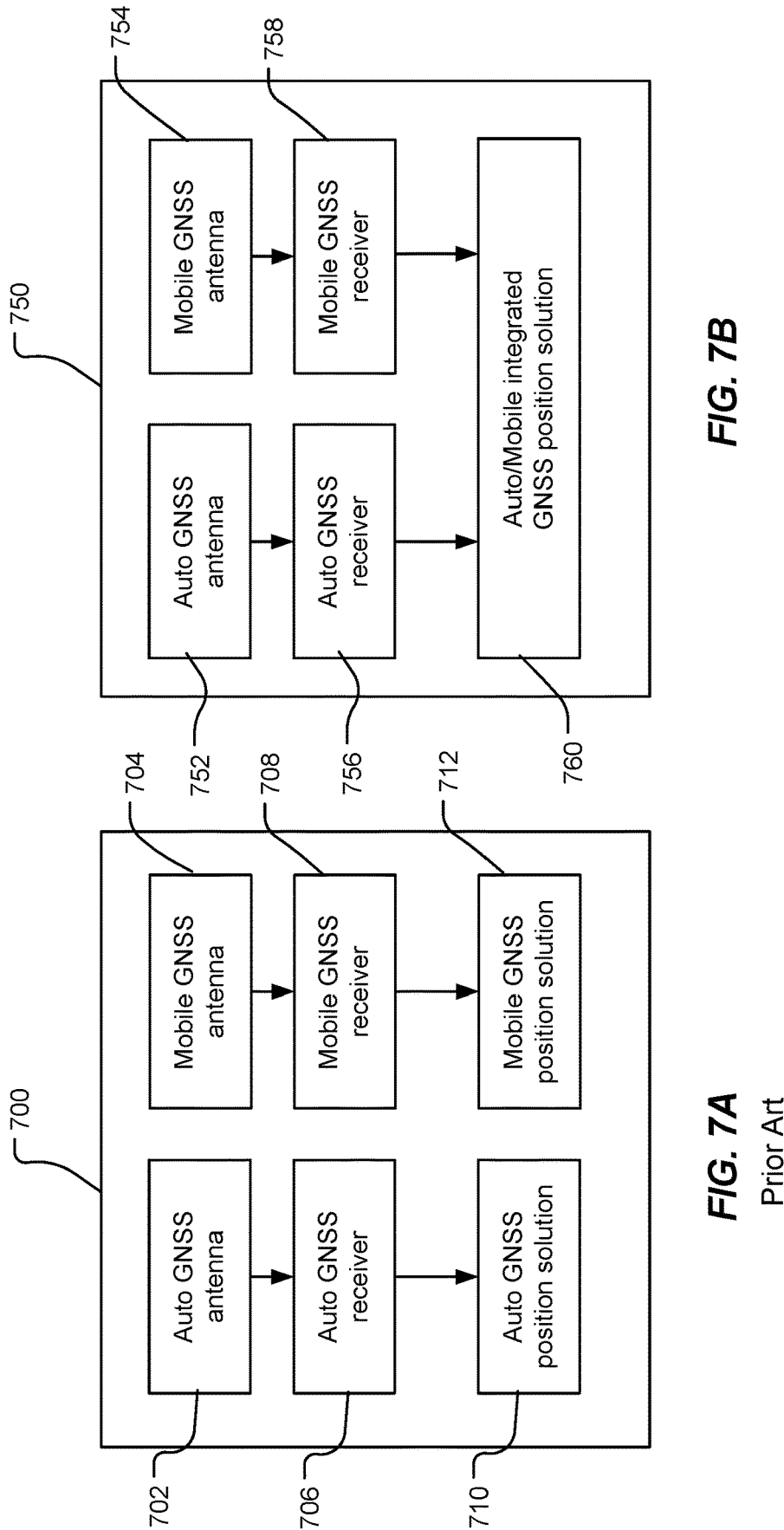
FIG. 7A is a block diagram of multiple GNSS receivers configured for individual positioning.
FIG. 7B is a block diagram of multiple GNSS receivers for cooperative positioning.

Referring to FIG. 7A, a block diagram 700 of multiple GNSS receivers configured for individual positioning is shown. The block diagram 700 includes a first GNSS receiver and a second GNSS receiver. The first GNSS receiver may be a vehicle mounted system and the second GNSS receiver may be a mobile device, such as a smartphone. The vehicle GNSS receiver includes a first GNSS antenna 702 and a first GNSS receiver 706 configured to output a first position solution 710. The mobile GNSS receiver includes a second GNSS antenna 704, and a second GNSS receiver 708 configured to output a second position solution 712. The block diagram 700 depicts an example prior art use case when a user carries a mobile device (e.g., smartphone) into a vehicle equipped with a GNSS receiver. The GNSS receivers in the mobile device and the vehicle receive satellite signals independently via the respective GNSS antennas 702, 704 and each of the respective GNSS receivers 706, 708 is configured to generate respective positioning solutions 710, 712. The techniques provided herein utilize the first and second GNSS receivers (and respective antennas) to generate integrated position solutions.

Referring to FIG. 7B, a block diagram 750 of multiple GNSS receivers for cooperative positioning is shown. The block diagram 750 also includes an example first GNSS receiver and an example second GNSS receiver. As described in FIG. 7A, the first GNSS receiver may be a vehicle mounted system and the second GNSS receiver may be a mobile device, such as a smartphone. The vehicle GNSS receiver includes a first GNSS antenna 752 and a first GNSS receiver 756, and the mobile GNSS receiver includes a second GNSS antenna 754, and a second GNSS receiver 758. The GNSS receivers in the mobile device and the vehicle receive satellite signals independently via the respective GNSS antennas 752, 754 and the respective GNSS receivers 756, 758 is configured to share measurement and/or positioning results at stage 760. For example, the second GNSS receiver 758 may be configured to provide measurement data and/or positioning results to the first GNSS receiver 756, or the first GNSS receiver 756 may be configured to provide measurement data and/or positioning results to the second GNSS receiver 758. In an example, the GNSS receivers 756, 758 may be configured to provide measurement data and/or positioning results to other systems. The data flow from the respective GNSS receivers 756, 758 may include one or more of position estimates (e.g., lat/long/alt), carrier phase information, pseudo ranges, doppler measurements, carrier-to-noise (C/NO) measurements, signal-to-noise (SNR) measurements, satellite and time information. Other receiver data may also be provided or exchanged. In an example, the receiver independent exchange format (RINEX) may be used to provide the measurement data and/or positioning results. Other data exchange formats such as RTCM (radio technical commission for maritime services) protocols, and other ASCII and binary formats may be used. Other proprietary data exchanges (e.g., Apple CarPlay, Android Auto, etc.) may also be used to share the measurement value and/or positioning results at stage 760. By integrating the GNSS measurement data between the auto and mobile GNSS receivers at stage 760, and computing an antenna baseline vector (i.e., based on the known geometry between the antennas 752, 754), the positioning performance of the cooperating GNSS receivers may be enhanced as described herein. For example, fix errors associated with IAR may be reduced; carrier phase cycle slip in one GNSS receiver may be detected and repaired based on the measurements of another GNSS receiver; the accuracy convergence of the positioning estimates of a first GNSS receiver may be improved by using the positioning measurements obtained by the second GNSS receiver; and IMU calibration may be realized based on the antenna baseline vector and the respective position estimates. Other advantages may also be realized.

Figure 8:
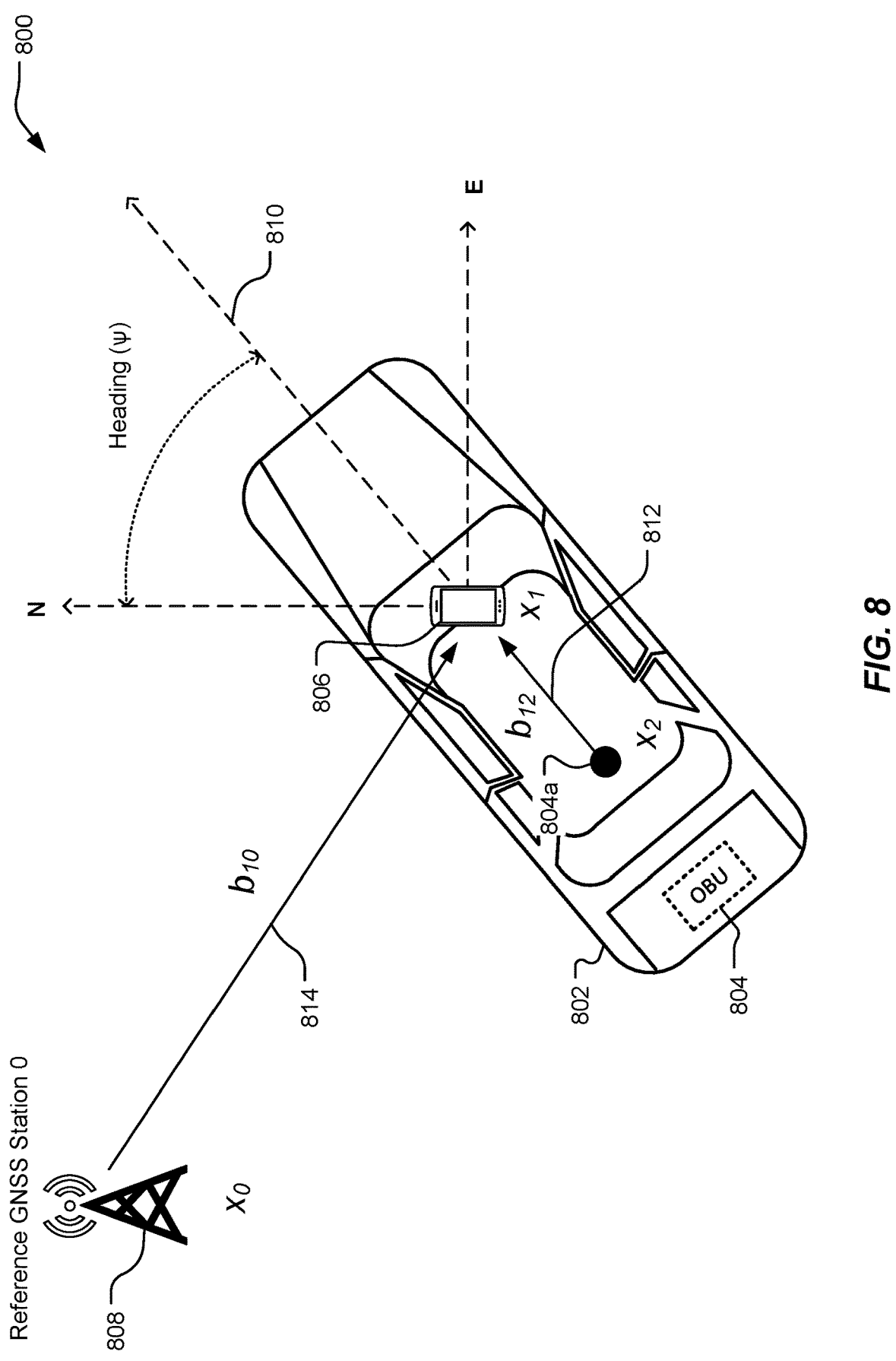
FIG. 8 is a diagram of a relative geometry between two example GNSS receiver antennas in a vehicle.

Referring to FIG. 8, a diagram 800 of a relative geometry between two example GNSS receiver antennas in a vehicle is shown. A vehicle 802 may include a GNSS receiver system such as included in an On-Board Unit (OBU) 804 with a roof mounted antenna 804*a*. A user may carry a mobile device 806 (e.g., smartphone, portable navigation system, etc.) into the vehicle 802 and utilize both the OBU and the mobile device 806 for cooperative navigation. In an example, the mobile device 806 may be communicatively coupled to the OBU 804 via wired or wireless connections. For example, a wireless protocol such as Bluetooth or WiFi may be used to enable the devices to communicate with one another. Wired connections may also be used. The OBU 804 and/or the mobile device 806 may be configured to determine a baseline geometry between their respective GNSS antenna systems (e.g., locations $x_1$ and $x_2$) and compute an antenna baseline vector 812 (e.g., the vector $b_{12}$ in the diagram 800). In an example, the antenna baseline vector 812 may be based on obtaining PPP/RTK with a reference GNSS station 808. For example, the reference GNSS station 808 may provide correction information 814 to each of the GNSS receivers. The GNSS receivers in the OBU 804 and the mobile device 806 may obtain IAR fixed status solutions and the antenna baseline vector 812 may be based on the respective position estimates. In an example, ranging messages such as WiFi and UWB may be used to determine the antenna baseline vector 812. Other technologies, such as cameras in the vehicle 804 and the mobile device 806 may be utilized to determine the relative locations of the GNSS antennas. In an example, the vehicle 802 may include a designated area for the mobile device 806 and a physical pre-survey (e.g., mechanical measurements) may be used to determine the antenna baseline vector 812 based on the designated area.

In an example, the cooperative positioning between the mobile device 806 and the OBU 804 may enable an estimation of a vehicle heading 810 without movement of the vehicle 802. The heading estimate may be independent of correction data (e.g., moving RTK base between the respective GNSS receivers). The vehicle heading 810 may be used to initialize and/or calibrate inertial sensors, such as the IMUs in the mobile device 806, the OBU 804, or other sensors in the vehicle 802.

While FIG. 8 depicts an automotive use case, the disclosure is not so limited. Other devices with GNSS receivers may be configured to cooperate as described herein. For example virtual reality (VR) or augmented reality (AR) devices (e.g., glasses, headsets, etc.) may be configured to cooperate with vehicle based GNSS systems and other mobile devices (e.g., smartphones). Other wearable devices such as smartwatches and personal navigation systems may be configured to cooperate with other mobile devices. In an example, a device or other platform with multiple GNSS antennas may be configured to enable cooperative processing of signals received by the different antennas as described herein.

Figure 9:
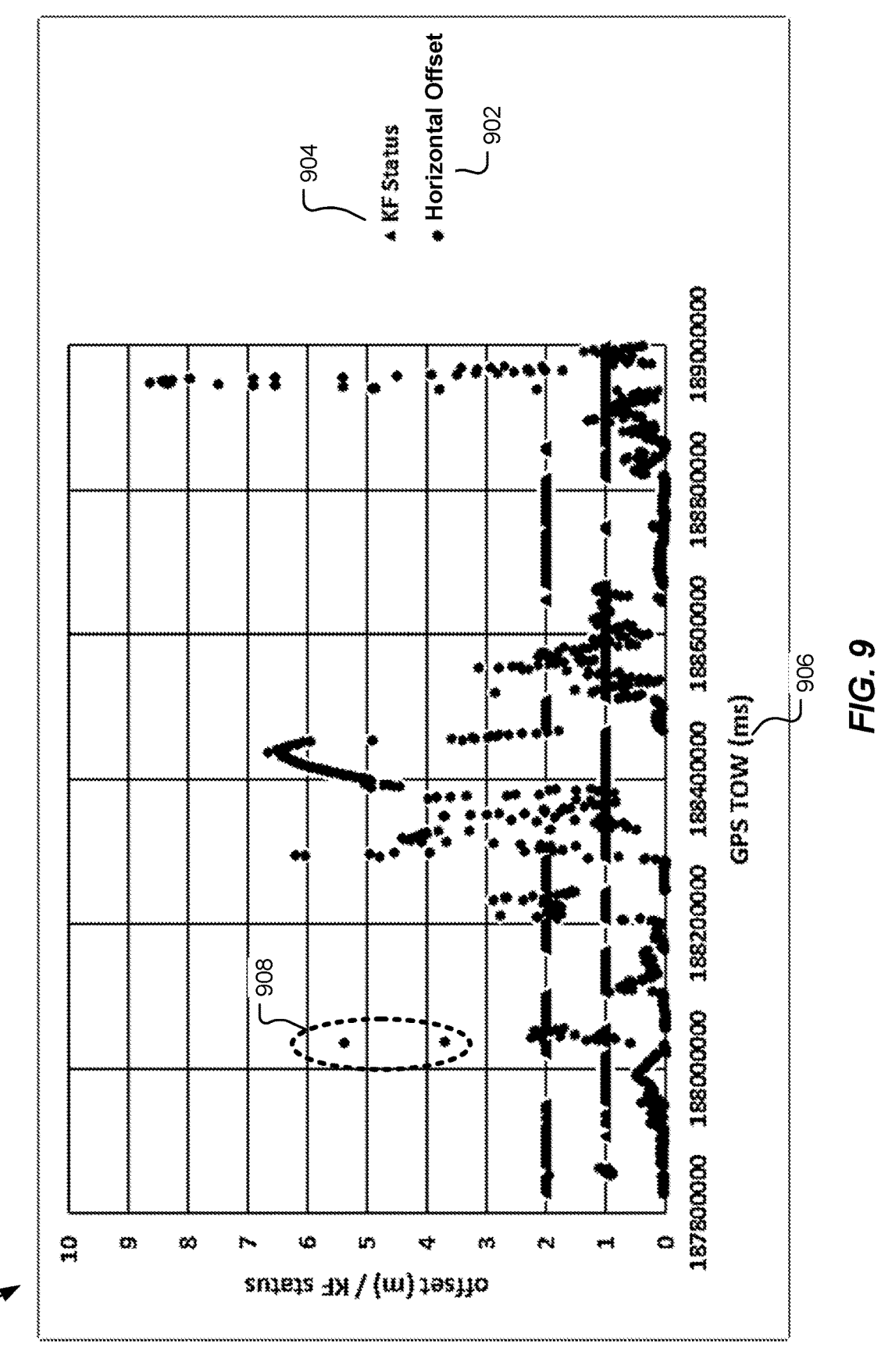
FIG. 9 is an example chart of detecting a wrong fix based on measurements from multiple GNSS receivers.

Referring to FIG. 9, with further reference to FIGS. 7B and 8, an example chart 900 of detecting a wrong fix based on measurements from multiple GNSS receivers is shown. The chart 900 includes a time of week (TOW) axis 906 and a plurality of datapoints associated with positioning solutions obtained by a first and second GNSS receiver. For example, a plurality of horizontal offset datapoints 902 represent a distance between the first GNSS antenna (e.g., the roof mounted antenna 804a) and the second GNSS antenna (e.g., the mobile device 806) as compared to the previously determined antenna baseline vector 812. A horizontal offset value of zero indicates that the GNSS position measurements obtained by the OBU 804 and the mobile device 806 at approximately the same time are equal to the distance of the antenna baseline vector 812. Horizontal offset values which are less than or greater than zero may indicate that the position measurements determined by the OBU 804 and/or the mobile device 806 may be in error. The horizontal offset datapoints 902 indicate the absolute value of the difference between the antenna baseline vector 812 and the distance between the respective GNSS position estimates. The chart 900 also includes a plurality of Kalman Filter (KF) IAR Status datapoints 904 representing whether the positioning solutions generated by the respective GNSS receivers are based on an IAR Float status or a IAR Fixed status. The KF Status datapoints 904 on the "1" line represent that one or both of the positioning solutions generated by the respective GNSS receivers in the OBU 804 and the mobile device 806 are based on an IAR float status. The KF Status datapoints 904 on the "2" line represent that both of the positioning solutions generated by the respective GNSS receivers in the OBU 804 and the mobile device 806 are based on an IAR fixed status.

When the IAR status is fixed on both the OBU 804 and the mobile device 806, a positioning solution error based on an IAR wrong fix scenario may be detected based on the known antenna baseline vector 812. For example, the graph region 908 includes two horizontal offset values that are greater than 3 meters when the KF Status for both position estimates is IAR Fixed. A threshold value (e.g., 0.2 m, 0.5 m, 1 m, 2 m, 5 m, etc.) based on the horizontal offset may be established and utilized as a trigger to detect the IAR wrong fix condition. In an example, upon detecting a IAR wrong fix condition, the respective GNSS receivers in the OBU 804 and the mobile device 806 may convert an RTK/PPP positioning solution to a IAR float ambiguity mode and compute a new horizontal offset. In an example, the IAR wrong fix trigger condition may cause one or both of the GNSS receivers in the OBU 804 and/or mobile device 806, respectively, to initialize a second RTK Kalman filter engine to attempt a fresh IAR fix and compute a new horizontal offset to verify the resulting position estimates. Other processes within the respective GNSS receivers, such as providing user alerts or other no-fix status indicators, may be generated based on determining an excess horizontal offset when both the position estimates in both GNSS receivers are based on an IAR fixed status.

Figure 10:
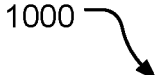
FIG. 10 is a process flow message of an example method for determining an antenna baseline vector for two GNSS receivers.
Figure 10:
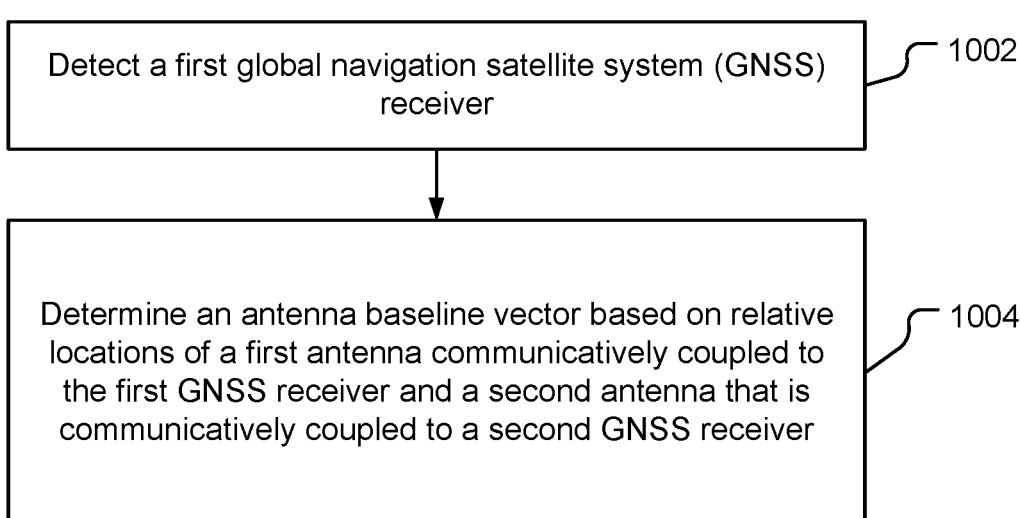

Referring to FIG. 10, with further reference to FIGS. 1-9, a method 1000 for determining an antenna baseline vector includes the stages shown. The method 1000 is, however, an example and not limiting. The method 1000 may be altered, e.g., by having stages added, removed, rearranged, combined, performed concurrently, and/or having single stages split into multiple stages.

At stage 1002, the method includes detecting a first global navigation satellite system (GNSS) receiver. An OBU 500 including a processor 510 and an interface 520, or a UE 200 including processors 210 and a transceiver 215, are example means for detecting the first GNSS receiver. In an example, two or more devices such as smartphones, vehicle mounted navigation systems, and other devices configured to obtain GNSS satellite signals and generate position estimates may be located in proximity to one another (e.g., 1 m, 2 m, 5 m, 10 m, etc.) and may be configured to perform the cooperative positioning techniques as described herein. In automotive and maritime use cases, an automobile or watercraft (or aircraft) may have an installed GNSS system with a fixed external antenna (e.g., the OBU 804 and the roof mounted antenna 804a). A user may bring a mobile device, such as a UE 200, into or onboard the vehicle. In an example, radio frequency techniques, such as Bluetooth pairing, WiFi sensing, UWB ranging, and other such techniques may be used by one or both of the devices to detect one another. In an example, a cable connection (e.g., USB) between a vehicle mounted GNSS receiver and the mobile device may be used to detect the presence of the first GNSS receiver. Other sensors in a vehicle may be used to detect the presence of a mobile device.

At stage 1004, the method includes determining an antenna baseline vector based on relative locations of a first antenna communicatively coupled to the first GNSS receiver and a second antenna that is communicatively coupled to a second GNSS receiver. The OBU 500 or the UE 200 are example means for determining the antenna baseline vector. In an example, referring to FIG. 8, the first GNSS receiver may be included in the mobile device 806 and the second GNSS receiver may be included in the OBU 804. Other devices and vehicle configurations may also be used. The OBU 804 and/or the mobile device 806 may be configured to determine a baseline geometry between their respective GNSS antenna systems (e.g., locations $x_1$ and $x_2$) and compute an antenna baseline vector 812 (e.g., the vector $b_{12}$ in the diagram 800). In an example, the antenna baseline vector 812 may be based on obtaining PPP/RTK with a reference GNSS station 808. The GNSS receivers in the OBU 804 and the mobile device 806 may obtain IAR fixed status solutions and the antenna baseline vector 812 may be based on the respective position estimates. In an example, ranging messages such as WiFi, Bluetooth and UWB may be exchanged between devices associated with the GNSS receivers (e.g., the mobile device 806 and the OBU 804 using the roof mounted antenna 804a) and the corresponding measurement results (e.g., RTT distance, AoA, AoD, etc.) may be used to determine the antenna baseline vector 812. Other technologies, such as cameras in the vehicle 804 and the mobile device 806 may be utilized to determine the relative locations of the GNSS antennas. In an example, the vehicle 802 may include a designated area for the mobile device 806 and a pre-survey may be used to determine the antenna baseline vector 812 based on the designated area. The antenna baseline vector value may be stored in local memory in the OBU 804 and/or the mobile device 806, and/or another networked device and may be used for the positioning procedures as described herein.

Referring to FIG. 11, with further reference to FIGS. 1-9, a method 1100 for generating a wrong fix indication based on measurements from multiple GNSS receivers includes the stages shown. The method 1100 is, however, an example and not limiting. The method 1100 may be altered, e.g., by having stages added, removed, rearranged, combined, performed concurrently, and/or having single stages split into multiple stages.

At stage 1102, the method includes determining an antenna baseline vector based on relative locations of a first antenna that is communicatively coupled to a first global navigation satellite system (GNSS) receiver and a second antenna that is communicatively coupled to a second GNSS receiver. An OBU 500 including a processor 510 and an interface 520, or a UE 200 including processors 210 and a transceiver 215, are example means for determining the antenna baseline vector. In an example, the first GNSS receiver and the second GNSS receiver may include one or more processors and memory configured to perform an algorithm as described in FIG. 10. The first and second GNSS receivers may be included in other devices such as the OBU 500 and the UE 200. Other techniques may be used to determine the relative positions of the first and second antennas and compute the antenna baseline vector 812.

At stage 1104, the method includes determining a first position estimate and a first integer ambiguity resolution (IAR) status with the first GNSS receiver at a first time. The OBU 500 and the UE 200 are example means for determining a first position estimate and a first IAR status. In an example, referring to FIG. 9, a first GNSS receiver such as a mobile device may be configured to utilize pseudorange computations to determine the number of whole cycles on the path between a satellite and the receiver and determine the integer ambiguity. In a first step in determining a position estimate, the GNSS receiver may be configured to estimate the integer ambiguity based on a statistical method such as least-squares (LS). The IAR status in such as solution is a float status. In additional steps, an integer ambiguity solution is used to correct the float solution. The resulting position estimate is more accurate than the float solution and is referred to as a fixed baseline solution (i.e., the IAR status is fixed). As indicated on the chart 900, a position estimate may be based on either an IAR float status or a an IAR fixed status. Continuing the example in FIG. 8, the GNSS receiver in the mobile device 806 may be configured to determine the first position estimate and the corresponding IAR status (e.g., float or fixed).

At stage 1106, the method includes determining a second position estimate and a second integer ambiguity resolution (IAR) status with the second GNSS receiver at approximately the first time. The OBU 500 and the UE 200 are example means for determining a second position estimate and second IAR status. Continuing the example in FIG. 8, the GNSS receiver in the OBU 804 may be configured to determine the second position estimate and the corresponding second IAR status (e.g., float or fixed) at approximately the same time as the mobile device 806 determines the first position estimate at stage 1104. Approximately the same time may be within 10 msec, 100 msec, 1 sec, 10 sec, or other values to reduce the impact of motion on the two GNSS receivers (i.e., if the vehicle 802 is in motion).

At stage 1108, the method includes computing a horizontal offset value based on the antenna baseline vector and a difference between the first position estimate and the second position estimate. The OBU 500 and the UE 200 are example means for computing the horizontal offset value. The first and second GNSS receivers may be communicatively coupled to one another via wired or wireless connections, and may be configured to provide their respective position estimates and IAR status information to one another. Either GNSS receiver may be configured to utilize the antenna baseline vector determined at stage 1102 and the respected first and second position estimates to determine the horizontal offset value. In an example, referring to FIG. 9, when both GNSS receivers obtain accurate position estimates, the difference in positions should be approximately equal to the antenna baseline vector and the horizontal offset value should be close to zero. Errors in the position estimates may cause the horizontal offset value to be larger than zero.

At stage 1110, the method includes generating a wrong fix indication in response to the first IAR status being fixed, the second IAR status being fixed, and the horizontal offset value being greater than a threshold value. The OBU 500 and the UE 200 are example means for generating a wrong fix indication. In an example, referring to FIG. 9, when the IAR status is fixed on both the first and second GNSS receivers, a positioning solution error based on an IAR wrong fix scenario may be detected based on the horizontal offset value. A threshold value (e.g., 0.2 m, 0.5 m, 1 m, 2 m, 5 m, etc.) based on the horizontal offset may be established and utilized as a trigger to detect the IAR wrong fix condition. Upon detecting the wrong fix condition, the first or second GNSS receivers (or their associated systems) may be configured to generate the wrong fix indication. In an example, in response to generating or receiving the wrong fix indication, the respective GNSS receivers may be configured to convert an RTK/PPP positioning solution to a IAR float ambiguity mode and compute a new horizontal offset. In an example, in response to generating or receiving the wrong fix indication, the GNSS receivers may be configured to initialize a second RTK Kalman filter engine to attempt a fresh IAR fix and compute a new horizontal offset to verify the resulting position estimates. Other wrong fix indications such as user alerts or other no-fix status indicators may be generated based on determining an excess horizontal offset when both the position estimates in both GNSS receivers are based on an IAR fixed status.

Referring to FIG. 12, with further reference to FIGS. 1-9, a method 1200 for repairing a cycle slip error in a GNSS receiver includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes determining an antenna baseline vector based on relative locations of a first antenna that is communicatively coupled to a first global navigation satellite system (GNSS) receiver and a second antenna that is communicatively coupled to a second GNSS receiver. An OBU 500 including a processor 510 and an interface 520, or a UE 200 including processors 210 and a transceiver 215, are example means for determining the antenna baseline vector. In an example, the first GNSS receiver and the second GNSS receiver may include one or more processors and memory configured to perform an algorithm as described in FIG. 10. The first and second GNSS receivers may be included in other devices such as the OBU 500 and the UE 200. Other techniques may be used to determine the relative positions of the first and second antennas and compute the antenna baseline vector 812.

At stage 1204, the method includes determining a first position estimate and a first integer ambiguity resolution (IAR) status with the first GNSS receiver at a first time. The OBU 500 and the UE 200 are example means for determining a first position estimate and a first IAR status. In an example, referring to FIG. 9, a first GNSS receiver such as a mobile device may be configured to utilize pseudorange computations to determine the number of whole cycles on the path between a satellite and the receiver and determine the integer ambiguity. In a first step in determining a position estimate, the GNSS receiver may be configured to estimate the integer ambiguity based on a statistical method such as least-squares (LS). The IAR status in such as solution is a float status. In additional steps, an integer ambiguity solution is used to correct the float solution. The resulting position estimate is more accurate than the float solution and is referred to as a fixed baseline solution (i.e., the IAR status is fixed). As indicated on the chart 900, a position estimate may be based on either an IAR float status or a an IAR fixed status. Continuing the example in FIG. 8, the GNSS receiver in the mobile device 806 may be configured to determine the first position estimate and the corresponding IAR status (e.g., float or fixed).

At stage 1206, the method includes determining a second position estimate and a second integer ambiguity resolution (IAR) status with the second GNSS receiver at approximately the first time. The OBU 500 and the UE 200 are example means for determining a second position estimate and second IAR status. Continuing the example in FIG. 8, the GNSS receiver in the OBU 804 may be configured to determine the second position estimate and the corresponding second IAR status (e.g., float or fixed) at approximately the same time as the mobile device 806 determines the first position estimate at stage 1104. Approximately the same time may be within 10 msec, 100 msec, 1 sec, 10 sec, or other values to reduce the impact of motion on the two GNSS receivers (i.e., if the vehicle 802 is in motion).

At stage 1208, the method includes determining a carrier phase value in the first GNSS receiver in response to the first IAR status being fixed and the second IAR status being float. The OBU 500 and the UE 200 are example means for determining the carrier phase value. The carrier phase value may be based on pseudorange measurement such as described in equation (1) obtained by the first GNSS receiver with a fixed IAR. The carrier phase may be expressed in unit cycles in the carrier frequency. The second GNSS receiver may be in an IAR float status based on a cycle slip detection within the second GNSS receiver. For example, the second GNSS receiver may lose a lock on the GNSS signal which may cause discontinuities in the phase measurements (i.e., cycle-slips). These discontinuities may manifest as changes in a number of integer number of wavelengths $\lambda$ (i.e., the integer ambiguity N changes by an arbitrary integer value). Different techniques such as operating over undifferenced, single-differenced or double-differenced measurement between pairs of satellites and receivers may be used for cycle-slip detection. When the cycle slip is detected in the second GNSS receiver, the IAR status becomes float.

At stage 1210, the method includes repairing a cycle slip error in the second GNSS receiver based at least in part on the carrier phase value and the antenna baseline vector. The OBU 500 and the UE 200 are example means for repairing the cycle slip error. In an example, the first GNSS receiver may be configured to provide the carrier phase value to the second GNSS receiver via a wired or wireless connection (e.g., a communication between the mobile device 806 and the OBU 804). The carrier phase obtained from the first GNSS receiver is based on an IAR with a fixed status and may be used to repair the cycle-slip error. In an example, the antenna baseline vector (i.e., the difference the location of the respective antennas for the first and second GNSS receivers) may be utilized to compensate the carrier phase value.

Referring to FIG. 13, with further reference to FIGS. 1-9, a method 1300 for improving positioning accuracy convergence in two GNSS receivers includes the stages shown. The method 1300 is, however, an example and not limiting. The method 1300 may be altered, e.g., by having stages added, removed, rearranged, combined, performed concurrently, and/or having single stages split into multiple stages. For example, providing the antenna baseline vector at stage 1306 may occur at stage 1302 when the antenna baseline vector is determined.

At stage 1302, the method includes determining an antenna baseline vector based on relative locations of a first antenna that is communicatively coupled to a first global navigation satellite system (GNSS) receiver and a second antenna that is communicatively coupled to a second GNSS receiver. An OBU 500 including a processor 510 and an interface 520, or a UE 200 including processors 210 and a transceiver 215, are example means for determining the antenna baseline vector. In an example, the first GNSS receiver and the second GNSS receiver may include one or more processors and memory configured to perform an algorithm as described in FIG. 10. The first and second GNSS receivers may be included in other devices such as the OBU 500 and the UE 200. Other techniques may be used to determine the relative positions of the first and second antennas and compute the antenna baseline vector 812.

At stage 1304, the method includes determining a first position estimate and a first integer ambiguity resolution (IAR) status with the first GNSS receiver. The OBU 500 and the UE 200 are example means for determining a first position estimate and a first IAR status. In an example, referring to FIG. 9, a first GNSS receiver such as a mobile device may be configured to utilize pseudorange computations to determine the number of whole cycles on the path between a satellite and the receiver and determine the integer ambiguity. In a first step in determining a position estimate, the GNSS receiver may be configured to estimate the integer ambiguity based on a statistical method such as least-squares (LS). The IAR status in such as solution is a float status. In additional steps, an integer ambiguity solution is used to correct the float solution. The resulting position estimate is more accurate than the float solution and is referred to as a fixed baseline solution (i.e., the IAR status is fixed). Continuing the example in FIG. 8, the GNSS receiver in the mobile device 806 may be configured to determine the first position estimate and the corresponding IAR status (e.g., float or fixed).

At stage 1306, the method includes providing the first position estimate and the antenna baseline vector to the second GNSS receiver in response to the first IAR status being fixed. The OBU 500 and the UE 200 are example means for providing the first position estimate and the antenna baseline vector. In an example, the mobile device 806 (e.g., the first GNSS receiver) may be configured to communicate with the OBU 804 (e.g., the second GNSS receiver) via wired or wireless protocols. In operation, when one of the GNSS receivers obtains a IAR fixed solution, the other GNSS receiver may quickly obtain an IAR fixed solution by using the IAR fixed solution from the first GNSS receiver in combination with the antenna baseline vector. In an automotive use case, as a user with a mobile device approaches a vehicle, the mobile device may generate position estimates based on an IAR fixed solution (e.g., short baseline RTK). The mobile device and the vehicle may perform a ranging exchange (e.g., WiFi, Bluetooth, UWB) as the user approaches to determine the antenna baseline vector. The vehicle based GNSS receiver may utilize the IAR fixed solution obtained by the mobile device (e.g., received from the mobile device via a sidelink transmission) in combination with the baseline vector to obtain an IAR fixed solution.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for generating a wrong fix indication based on measurements from multiple global navigation satellite system (GNSS) receivers, comprising: determining an antenna baseline vector based on relative locations of a first antenna that is communicatively coupled to a first global navigation satellite system (GNSS) receiver and a second antenna that is communicatively coupled to a second GNSS receiver; determining a first position estimate and a first integer ambiguity resolution (IAR) status with the first GNSS receiver at a first time; determining a second position estimate and a second IAR status with the second GNSS receiver at approximately the first time; computing a horizontal offset value based on the antenna baseline vector and a difference between the first position estimate and the second position estimate; and generating the wrong fix indication in response to the first IAR status being fixed, the second IAR status being fixed, and the horizontal offset value being greater than a threshold value.

Clause 2. The method of clause 1 wherein at least one of the first GNSS receiver and the second GNSS receiver is a smartphone.

Clause 3. The method of clause 1 wherein at least one of the first GNSS receiver and the second GNSS receiver is a vehicle mounted system with the second antenna being in a fixed antenna location.

Clause 4. The method of clause 1 wherein determining the antenna baseline vector includes performing a radio frequency ranging exchange between a first device associated with the first GNSS receiver and a second device associated with the second GNSS receiver.

Clause 5. The method of clause 4 wherein the radio frequency ranging exchange includes one or more ultrawideband (UWB) ranging messages.

Clause 6. The method of clause 1 wherein determining the antenna baseline vector includes obtaining respective position estimates for the first GNSS receiver and the second GNSS receiver based on a precise point positioning (PPP) or real time kinematic (RTK) and correction signals received from a reference GNSS station.

Clause 7. The method of clause 1 wherein determining the antenna baseline vector includes performing a physical pre-survey of the relative locations of the first antenna and the second antenna.

Clause 8. The method of clause 1 further comprising converting the first IAR status or the second IAR status to a float value in response to generating the wrong fix indication.

Clause 9. The method of clause 1 further comprising initializing a second real-time kinematic (RTK) Kalman filter engine in the first GNSS receiver or the second GNSS receiver and determining one or more respective position estimates for the first GNSS receiver or the second GNSS receiver in response to generating the wrong fix indication.

Clause 10. A method for repairing a cycle slip error in a global navigation satellite system (GNSS) receiver, comprising: determining an antenna baseline vector based on relative locations of a first antenna that is communicatively coupled to a first global navigation satellite system (GNSS) receiver and a second antenna that is communicatively coupled to a second GNSS receiver; determining a first position estimate and a first integer ambiguity resolution (IAR) status with the first GNSS receiver at a first time; determining a second position estimate and a second IAR status with the second GNSS receiver at approximately the first time; determining a carrier phase value in the first GNSS receiver in response to the first IAR status being fixed and the second IAR status being float; and repairing the cycle slip error in the second GNSS receiver based at least in part on the carrier phase value and the antenna baseline vector.

Clause 11. The method of clause 10 wherein at least one of the first GNSS receiver and the second GNSS receiver is a smartphone.

Clause 12. The method of clause 10 wherein at least one of the first GNSS receiver and the second GNSS receiver is a vehicle mounted system with the second antenna being in a fixed antenna location.

Clause 13. The method of clause 10 wherein determining the antenna baseline vector includes performing a radio frequency ranging exchange between a first device associated with the first GNSS receiver and a second device associated with the second GNSS receiver.

Clause 14. The method of clause 10 wherein determining the antenna baseline vector includes obtaining respective position estimates for the first GNSS receiver and the second GNSS receiver based on a precise point positioning (PPP) or real time kinematic (RTK) and correction signals received from a reference GNSS station.

Clause 15. The method of clause 10 wherein determining the antenna baseline vector includes performing a physical pre-survey of the relative locations of the first antenna and the second antenna.

Clause 16. A method for improving positioning accuracy convergence in two global navigation satellite system (GNSS) receivers, comprising: determining an antenna baseline vector based on relative locations of a first antenna that is communicatively coupled to a first global navigation satellite system (GNSS) receiver and a second antenna that is communicatively coupled to a second GNSS receiver; determining a first position estimate and a first integer ambiguity resolution (IAR) status with the first GNSS receiver; and providing the first position estimate and the antenna baseline vector to the second GNSS receiver in response to the first IAR status being fixed.

Clause 17. The method of clause 16 wherein the first GNSS receiver is a smartphone and the second GNSS receiver is disposed in a vehicle with the second antenna being in a fixed location on the vehicle.

Clause 18. The method of clause 17 wherein the smartphone is disposed outside and proximate to the vehicle, and determining the antenna baseline vector includes performing a radio frequency ranging exchange between the smartphone and an on-board unit disposed in the vehicle.

Clause 19. The method of clause 18 wherein the radio frequency ranging exchange includes one or more ultrawideband (UWB) ranging messages.

Clause 20. The method of clause 18 wherein providing the first position estimate and the antenna baseline vector includes providing one or more sidelink messages including the first position estimate and the antenna baseline vector to the on-board unit.

Clause 21. The method of clause 17 wherein the smartphone is disposed within the vehicle, and determining the antenna baseline vector includes performing a radio frequency ranging exchange between the smartphone and an on-board unit disposed in the vehicle.

Clause 22. The method of clause 16 wherein determining the antenna baseline vector includes obtaining respective position estimates for the first GNSS receiver and the second GNSS receiver based on a precise point positioning (PPP) or real time kinematic (RTK) and correction signals received from a reference GNSS station.

Clause 23. An apparatus, comprising: a memory; at least one transceiver; at least one processor communicatively coupled to the memory and the at least one transceiver, and configured to: determine an antenna baseline vector based on relative locations of a first antenna that is communicatively coupled to a first global navigation satellite system (GNSS) receiver and a second antenna that is communicatively coupled to a second GNSS receiver; determine a first position estimate and a first integer ambiguity resolution (IAR) status with the first GNSS receiver at a first time; determine a second position estimate and a second IAR status with the second GNSS receiver at approximately the first time; compute a horizontal offset value based on the antenna baseline vector and a difference between the first position estimate and the second position estimate; and generate a wrong fix indication in response to the first IAR status being fixed, the second IAR status being fixed, and the horizontal offset value being greater than a threshold value.

Clause 24. The apparatus of clause 23 wherein at least one of the first GNSS receiver and the second GNSS receiver is a smartphone.

Clause 25. The apparatus of clause 23 wherein at least one of the first GNSS receiver and the second GNSS receiver is a vehicle mounted system with the second antenna being in a fixed antenna location.

Clause 26. The apparatus of clause 23 wherein the at least one processor is further configured to perform a radio frequency ranging exchange between a first device associated with the first GNSS receiver and a second device associated with the second GNSS receiver to determine the antenna baseline vector.

Clause 27. The apparatus of clause 26 wherein the radio frequency ranging exchange includes one or more ultrawideband (UWB) ranging messages.

Clause 28. The apparatus of clause 23 wherein the at least one processor is further configured to obtain respective position estimates for the first GNSS receiver and the second GNSS receiver based on a precise point positioning (PPP) or real time kinematic (RTK) and correction signals received from a reference GNSS station to determine the antenna baseline vector.

Clause 29. The apparatus of clause 23 wherein the at least one processor is further configured to receive the relative locations of the first antenna and the second antenna based on a physical pre-survey.

Clause 30. The apparatus of clause 23 wherein the at least one processor is further configured to convert the first IAR status or the second IAR status to a float value.

Clause 31. The method of clause 23 wherein the at least one processor is further configured to initialize a second real-time kinematic (RTK) Kalman filter engine in the first GNSS receiver or the second GNSS receiver and determine one or more respective position estimates for the first GNSS receiver or the second GNSS receiver.

Clause 32. An apparatus, comprising: a memory; at least one transceiver; at least one processor communicatively coupled to the memory and the at least one transceiver, and configured to: determine an antenna baseline vector based on relative locations of a first antenna that is communicatively coupled to a first global navigation satellite system (GNSS) receiver and a second antenna that is communicatively coupled to a second GNSS receiver; determine a first position estimate and a first integer ambiguity resolution (IAR) status with the first GNSS receiver at a first time; determine a second position estimate and a second IAR status with the second GNSS receiver at approximately the first time; determine a carrier phase value in the first GNSS receiver in response to the first IAR status being fixed and the second IAR status being float; and repair a cycle slip error in the second GNSS receiver based at least in part on the carrier phase value and the antenna baseline vector.

Clause 33. The apparatus of clause 32 wherein at least one of the first GNSS receiver and the second GNSS receiver is a smartphone.

Clause 34. The apparatus of clause 32 wherein at least one of the first GNSS receiver and the second GNSS receiver is a vehicle mounted system with the second antenna being in a fixed antenna location.

Clause 35. The apparatus of clause 32 wherein the at least one processor is further configured to perform a radio frequency ranging exchange between a first device associated with the first GNSS receiver and a second device associated with the second GNSS receiver to determine the antenna baseline vector.

Clause 36. The apparatus of clause 32 wherein the at least one processor is further configured to obtain respective position estimates for the first GNSS receiver and the second GNSS receiver based on a precise point positioning (PPP) or real time kinematic (RTK) and correction signals received from a reference GNSS station to determine the antenna baseline vector.

Clause 37. The apparatus of clause 32 wherein in the at least one processor is further configured to receive the relative locations of the first antenna and the second antenna based on a physical pre-survey.

Clause 38. An apparatus, comprising: a memory; at least one transceiver; at least one processor communicatively coupled to the memory and the at least one transceiver, and configured to: determine an antenna baseline vector based on relative locations of a first antenna that is communicatively coupled to a first global navigation satellite system (GNSS) receiver and a second antenna that is communicatively coupled to a second GNSS receiver; determine a first position estimate and a first integer ambiguity resolution (IAR) status with the first GNSS receiver; and provide the first position estimate and the antenna baseline vector to the second GNSS receiver in response to the first IAR status being fixed.

Clause 39. The apparatus of clause 28 wherein the first GNSS receiver is a smartphone and the second GNSS receiver is disposed in a vehicle with the second antenna being in a fixed location on the vehicle.

Clause 40. The apparatus of clause 39 wherein the smartphone is disposed outside and proximate to the vehicle, and the at least one processor is further configured to performing a radio frequency ranging exchange with the smartphone.

Clause 41. The apparatus of clause 40 wherein the radio frequency ranging exchange includes one or more ultrawideband (UWB) ranging messages.

Clause 42. The apparatus of clause 40 wherein the at least one processor is further configured to provide one or more sidelink messages including the first position estimate and the antenna baseline vector.

Clause 43. The apparatus of clause 39 wherein the smartphone is disposed within the vehicle, and the at least one processor is further configured to perform a radio frequency ranging exchange with the smartphone.

Clause 44. The apparatus of clause 38 wherein the at least one processor is further configured to obtain respective position estimates for the first GNSS receiver and the second GNSS receiver based on a precise point positioning (PPP) or real time kinematic (RTK) and correction signals received from a reference GNSS station.

Clause 45. An apparatus for generating a wrong fix indication based on measurements from multiple global navigation satellite system (GNSS) receivers, comprising: means for determining an antenna baseline vector based on relative locations of a first antenna that is communicatively coupled to a first global navigation satellite system (GNSS) receiver and a second antenna that is communicatively coupled to a second GNSS receiver; means for determining a first position estimate and a first integer ambiguity resolution (IAR) status with the first GNSS receiver at a first time; means for determining a second position estimate and a second IAR status with the second GNSS receiver at approximately the first time; means for computing a horizontal offset value based on the antenna baseline vector and a difference between the first position estimate and the second position estimate; and means for generating the wrong fix indication in response to the first IAR status being fixed, the second IAR status being fixed, and the horizontal offset value being greater than a threshold value.

Clause 46. An apparatus for repairing a cycle slip error in a global navigation satellite system (GNSS) receiver, comprising: means for determining an antenna baseline vector based on relative locations of a first antenna that is communicatively coupled to a first global navigation satellite system (GNSS) receiver and a second antenna that is communicatively coupled to a second GNSS receiver; means for determining a first position estimate and a first integer ambiguity resolution (IAR) status with the first GNSS receiver at a first time; means for determining a second position estimate and a second IAR status with the second GNSS receiver at approximately the first time; means for determining a carrier phase value in the first GNSS receiver in response to the first IAR status being fixed and the second IAR status being float; and means for repairing the cycle slip error in the second GNSS receiver based at least in part on the carrier phase value and the antenna baseline vector.

Clause 47. An apparatus for improving positioning accuracy convergence in two global navigation satellite system (GNSS) receivers, comprising: means for determining an antenna baseline vector based on relative locations of a first antenna that is communicatively coupled to a first global navigation satellite system (GNSS) receiver and a second antenna that is communicatively coupled to a second GNSS receiver; means for determining a first position estimate and a first integer ambiguity resolution (IAR) status with the first GNSS receiver; and means for providing the first position estimate and the antenna baseline vector to the second GNSS receiver in response to the first IAR status being fixed.

Clause 48. A non-transitory processor-readable storage medium comprising processor-readable instructions configured to cause one or more processors to generate a wrong fix indication based on measurements from multiple global navigation satellite system (GNSS) receivers, comprising code for: determining an antenna baseline vector based on relative locations of a first antenna that is communicatively coupled to a first global navigation satellite system (GNSS) receiver and a second antenna that is communicatively coupled to a second GNSS receiver; determining a first position estimate and a first integer ambiguity resolution (IAR) status with the first GNSS receiver at a first time; determining a second position estimate and a second IAR status with the second GNSS receiver at approximately the first time; computing a horizontal offset value based on the antenna baseline vector and a difference between the first position estimate and the second position estimate; and generating the wrong fix indication in response to the first IAR status being fixed, the second IAR status being fixed, and the horizontal offset value being greater than a threshold value.

Clause 49. A non-transitory processor-readable storage medium comprising processor-readable instructions configured to cause one or more processors to repair a cycle slip error in a global navigation satellite system (GNSS) receiver, comprising code for: determining an antenna baseline vector based on relative locations of a first antenna that is communicatively coupled to a first global navigation satellite system (GNSS) receiver and a second antenna that is communicatively coupled to a second GNSS receiver; determining a first position estimate and a first integer ambiguity resolution (IAR) status with the first GNSS receiver at a first time; determining a second position estimate and a second IAR status with the second GNSS receiver at approximately the first time; determining a carrier phase value in the first GNSS receiver in response to the first IAR status being fixed and the second IAR status being float; and repairing the cycle slip error in the second GNSS receiver based at least in part on the carrier phase value and the antenna baseline vector.

Clause 50. A non-transitory processor-readable storage medium comprising processor-readable instructions configured to cause one or more processors to improve positioning accuracy convergence in two global navigation satellite system (GNSS) receivers, comprising code for: determining an antenna baseline vector based on relative locations of a first antenna that is communicatively coupled to a first global navigation satellite system (GNSS) receiver and a second antenna that is communicatively coupled to a second GNSS receiver; determining a first position estimate and a first integer ambiguity resolution (IAR) status with the first GNSS receiver; and providing the first position estimate and the antenna baseline vector to the second GNSS receiver in response to the first IAR status being fixed.

The invention claimed is:

1. A method for improving positioning accuracy convergence in two global navigation satellite system (GNSS) receivers, comprising:
   determining an antenna baseline vector based on relative locations of a first antenna that is communicatively coupled to a first global navigation satellite system (GNSS) receiver and a second antenna that is communicatively coupled to a second GNSS receiver, wherein the antenna baseline vector is referenced from the first antenna to the second antenna;
   determining a first position estimate and a first integer ambiguity resolution (IAR) status with the first GNSS receiver, wherein the first IAR status is at least either a float status or a fixed status; and
   providing the first position estimate and the antenna baseline vector to the second GNSS receiver in response to the first IAR status being the fixed status.

2. The method of claim 1 wherein the first GNSS receiver is a smartphone and the second GNSS receiver is disposed in a vehicle with the second antenna being in a fixed location on the vehicle.

3. The method of claim 2 wherein the smartphone is disposed outside and proximate to the vehicle, and determining the antenna baseline vector includes performing a radio frequency ranging exchange between the smartphone and an on-board unit disposed in the vehicle.

4. The method of claim 3 wherein the radio frequency ranging exchange includes one or more ultrawideband (UWB) ranging messages.

5. The method of claim 3 wherein providing the first position estimate and the antenna baseline vector includes providing one or more sidelink messages including the first position estimate and the antenna baseline vector to the on-board unit.

6. The method of claim 2 wherein the smartphone is disposed within the vehicle, and determining the antenna baseline vector includes performing a radio frequency ranging exchange between the smartphone and an on-board unit disposed in the vehicle.

7. The method of claim 1 wherein determining the antenna baseline vector includes obtaining respective position estimates for the first GNSS receiver and the second GNSS receiver based on a precise point positioning (PPP) or real time kinematic (RTK) and correction signals received from a reference GNSS station.

8. An apparatus, comprising:
   a memory;
   at least one transceiver;
   at least one processor communicatively coupled to the memory and the at least one transceiver, and configured to:
      determine an antenna baseline vector based on relative locations of a first antenna that is communicatively coupled to a first global navigation satellite system (GNSS) receiver and a second antenna that is communicatively coupled to a second GNSS receiver, wherein the antenna baseline vector is referenced from the first antenna to the second antenna;
      determine a first position estimate and a first integer ambiguity resolution (IAR) status with the first GNSS receiver, wherein the first IAR status is at least either a float status or a fixed status; and
      provide the first position estimate and the antenna baseline vector to the second GNSS receiver in response to the first IAR status being the fixed status.

9. The apparatus of claim 8 wherein the first GNSS receiver is a smartphone and the second GNSS receiver is disposed in a vehicle with the second antenna being in a fixed location on the vehicle.

10. The apparatus of claim 9 wherein the at least one processor is further configured to perform a radio frequency ranging exchange with the smartphone.

11. The apparatus of claim 10 wherein the radio frequency ranging exchange includes one or more ultrawideband (UWB) ranging messages.

12. The apparatus of claim 10 wherein the at least one processor is further configured to provide one or more sidelink messages including the first position estimate and the antenna baseline vector.

13. The apparatus of claim 8 wherein the at least one processor is further configured to obtain respective position estimates for the first GNSS receiver and the second GNSS receiver based on a precise point positioning (PPP) or real time kinematic (RTK) and correction signals received from a reference GNSS station.

14. An apparatus for improving positioning accuracy convergence in two global navigation satellite system (GNSS) receivers, comprising:
   means for determining an antenna baseline vector based on relative locations of a first antenna that is communicatively coupled to a first global navigation satellite system (GNSS) receiver and a second antenna that is communicatively coupled to a second GNSS receiver, wherein the antenna baseline vector is referenced from the first antenna to the second antenna;
   means for determining a first position estimate and a first integer ambiguity resolution (IAR) status with the first GNSS receiver, wherein the first IAR status is at least either a float status or a fixed status; and
   means for providing the first position estimate and the antenna baseline vector to the second GNSS receiver in response to the first IAR status being the fixed status.

15. The apparatus of claim 14 wherein the first GNSS receiver is a smartphone and the second GNSS receiver is disposed in a vehicle with the second antenna being in a fixed location on the vehicle.

16. The apparatus of claim 15 wherein the means for determining the antenna baseline vector includes means for performing a radio frequency ranging exchange between the smartphone and an on-board unit disposed in the vehicle.

17. The apparatus of claim 16 wherein the radio frequency ranging exchange includes one or more ultrawideband (UWB) ranging messages.

18. The apparatus of claim 16 wherein the means for providing the first position estimate and the antenna baseline vector includes means for providing one or more sidelink messages including the first position estimate and the antenna baseline vector to the on-board unit.

19. The apparatus of claim 14 wherein the means for determining the antenna baseline vector includes means for obtaining respective position estimates for the first GNSS receiver and the second GNSS receiver based on a precise point positioning (PPP) or real time kinematic (RTK) and correction signals received from a reference GNSS station.

20. A non-transitory processor-readable storage medium comprising processor-readable instructions configured to cause one or more processors to improve positioning accuracy convergence in two global navigation satellite system (GNSS) receivers, comprising code for:

determining an antenna baseline vector based on relative locations of a first antenna that is communicatively coupled to a first global navigation satellite system (GNSS) receiver and a second antenna that is communicatively coupled to a second GNSS receiver, wherein the antenna baseline vector is referenced from the first antenna to the second antenna;

determining a first position estimate and a first integer ambiguity resolution (IAR) status with the first GNSS receiver, wherein the first IAR status is at least either a float status or a fixed status; and providing the first position estimate and the antenna baseline vector to the second GNSS receiver in response to the first IAR status being the fixed status.

21. The non-transitory processor-readable storage medium of claim 20 wherein the first GNSS receiver is a smartphone and the second GNSS receiver is disposed in a vehicle with the second antenna being in a fixed location on the vehicle.

22. The non-transitory processor-readable storage medium of claim 21 wherein the code for determining the antenna baseline vector includes code for performing a radio frequency ranging exchange between the smartphone and an on-board unit disposed in the vehicle.

23. The non-transitory processor-readable storage medium of claim 22 wherein the radio frequency ranging exchange includes one or more ultrawideband (UWB) ranging messages.

24. The non-transitory processor-readable storage medium of claim 22 wherein the code for providing the first position estimate and the antenna baseline vector includes code for providing one or more sidelink messages including the first position estimate and the antenna baseline vector to the on-board unit.

25. The non-transitory processor-readable storage medium of claim 20 wherein the code for determining the antenna baseline vector includes code for obtaining respective position estimates for the first GNSS receiver and the second GNSS receiver based on a precise point positioning (PPP) or real time kinematic (RTK) and correction signals received from a reference GNSS station.

* * * * *